US012657333B1

(12) United States Patent　(10) Patent No.:　US 12,657,333 B1
Scriber et al.　(45) Date of Patent:　Jun. 16, 2026

(54) SYSTEMS AND METHODS FOR ADVANCED DATA PRIVACY PROTECTION

(71) Applicant: CABLE TELEVISION LABORATORIES, INC., Louisville, CO (US)

(72) Inventors: Brian A. Scriber, Lafayette, CO (US); Steven J. Goeringer, Westminster, CO (US); Tao Wan, Ottawa (CA); Kyle Haefner, Fort Collins, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 185 days.

(21) Appl. No.: 17/947,725

(22) Filed: Sep. 19, 2022

Related U.S. Application Data

(60) Provisional application No. 63/358,408, filed on Jul. 5, 2022, provisional application No. 63/344,739, filed on May 23, 2022, provisional application No. 63/282,552, filed on Nov. 23, 2021, provisional application No. 63/245,547, filed on Sep. 17, 2021.

(51) Int. Cl.
　　*G06F 21/62*　　(2013.01)
　　*G06Q 50/26*　　(2024.01)
(52) U.S. Cl.
　　CPC ....... *G06F 21/6245* (2013.01); *G06Q 50/265* (2013.01)
(58) Field of Classification Search
　　CPC ......................... G06F 21/6245; G06Q 50/265
　　See application file for complete search history.

(56) References Cited

U.S. PATENT DOCUMENTS

| | | | |
|---|---|---|---|
| 8,868,592 B1 | 10/2014 | Weininger et al. | |
| 9,135,629 B2 * | 9/2015 | Simeonov | G06Q 30/02 |
| 10,997,244 B2 | 5/2021 | Russell et al. | |
| 11,641,369 B1 | 5/2023 | Anturkar et al. | |
| 12,118,562 B2 | 10/2024 | McLachlan | |
| 12,346,477 B2 | 7/2025 | Cook | |
| 2002/0029201 A1 * | 3/2002 | Barzilai | G06F 21/6245 |
| | | | 705/26.1 |
| 2002/0099824 A1 | 7/2002 | Bender et al. | |
| 2002/0156846 A1 | 10/2002 | Rawat et al. | |
| 2002/0188572 A1 | 12/2002 | Bleizeffer et al. | |
| 2003/0004734 A1 | 1/2003 | Adler et al. | |
| 2004/0068477 A1 | 4/2004 | Gilmour et al. | |

(Continued)

OTHER PUBLICATIONS

No stated author; "Fill out forms automatically"; 2020; retrieved from the Internet https://web.archive.org/web/20200427230223/https://support.google.com/chrome/answer/142893; pp. 1-3, as printed (Year: 2020).

*Primary Examiner* — Theodore C Parsons
(74) *Attorney, Agent, or Firm* — Armstrong Teasdale LLP

(57)　　　ABSTRACT

A server device is provided for protecting consumer privacy. The server device includes a server device programmed to a) receive, from a consumer computer device associated with a consumer, an access request to access a service; b) retrieve a consumer privacy preference associated with the consumer from a consumer privacy preference storage; c) retrieve a service privacy request associated with the service from a service privacy request storage; d) compare the consumer privacy preference to the service privacy request to determine if there are any conflicts; and e) if there are no conflicts, permit the consumer computer device to access the service.

26 Claims, 14 Drawing Sheets

(56)         References Cited

U.S. PATENT DOCUMENTS

| | | | |
|---|---|---|---|
| 2005/0076233 A1* | 4/2005 | Aarts | H04L 67/306 |
| | | | 726/4 |
| 2005/0188220 A1 | 8/2005 | Nilsson et al. | |
| 2005/0193093 A1 | 9/2005 | Mathew et al. | |
| 2005/0251865 A1* | 11/2005 | Mont | G06F 21/6245 |
| | | | 726/26 |
| 2006/0253578 A1 | 11/2006 | Dixon et al. | |
| 2008/0235623 A1 | 9/2008 | Li | |
| 2009/0254971 A1* | 10/2009 | Herz | G06Q 10/10 |
| | | | 726/1 |
| 2009/0276825 A1* | 11/2009 | Hatakeyama | H04L 67/306 |
| | | | 726/1 |
| 2011/0126290 A1 | 5/2011 | Krishnamurthy et al. | |
| 2012/0240050 A1 | 9/2012 | Goldfeder et al. | |
| 2013/0060852 A1 | 3/2013 | Davis et al. | |
| 2013/0173642 A1 | 7/2013 | Oliver | |
| 2013/0212638 A1 | 8/2013 | Wilson | |
| 2013/0297626 A1 | 11/2013 | Levi et al. | |
| 2014/0040134 A1* | 2/2014 | Ciurea | G06Q 20/383 |
| | | | 705/44 |
| 2014/0259096 A1* | 9/2014 | Biswas | H04L 63/102 |
| | | | 726/1 |
| 2014/0331119 A1 | 11/2014 | Dixon et al. | |
| 2015/0082455 A1 | 3/2015 | Jalili | |
| 2016/0164915 A1 | 6/2016 | Cook | |
| 2016/0284035 A1 | 9/2016 | Muttik | |
| 2017/0078922 A1 | 3/2017 | Raleigh et al. | |
| 2017/0193624 A1 | 7/2017 | Tsai | |
| 2018/0115625 A1 | 4/2018 | Livneh | |
| 2018/0262514 A1 | 9/2018 | Hall et al. | |
| 2018/0293283 A1 | 10/2018 | Litoiu et al. | |
| 2019/0018904 A1 | 1/2019 | Russell et al. | |
| 2019/0108353 A1 | 4/2019 | Sadeh et al. | |
| 2019/0392171 A1 | 12/2019 | Barday et al. | |
| 2020/0004986 A1 | 1/2020 | Brannon et al. | |
| 2020/0026876 A1 | 1/2020 | Garg et al. | |
| 2020/0349280 A1 | 11/2020 | Cook | |
| 2021/0081567 A1 | 3/2021 | Park et al. | |
| 2021/0097201 A1 | 4/2021 | Wasicek et al. | |
| 2021/0192651 A1 | 6/2021 | Groth et al. | |
| 2021/0256163 A1 | 8/2021 | Fleming et al. | |
| 2021/0288965 A1* | 9/2021 | Afroz | G06F 21/6245 |
| 2022/0083692 A1 | 3/2022 | Maduranthakam Kidambi Sridhar et al. | |

* cited by examiner

SYSTEMS AND METHODS FOR ADVANCED DATA PRIVACY PROTECTION

CROSS REFERENCE TO RELATED APPLICATIONS

This application claims priority to U.S. Provisional Application Ser. No. 63/245,547, filed Sep. 17, 2021, to U.S. Provisional Application Ser. No. 63/282,552, filed Nov. 23, 2021, to U.S. Provisional Application Ser. No. 63/344,739, filed May 23, 2022, and to U.S. Provisional Application Ser. No. 63/358,408, filed Jul. 5, 2022, which are hereby incorporated by reference in their entirety.

BACKGROUND

The field of the invention relates generally to data privacy protection, and more particularly, to systems and methods for using consumer defined privacy policies with service defined privacy policies.

Several regulatory and legislative frameworks exist globally which each aim to address different elements of data protection and individual privacy (GDPR, CCPA, CPRA, HIPAA, ARRA, et alia). Each of these statutory documents uses different language to describe Protected Entities (PEs) and Protected Data (PD) as well as what is allowed in different scenarios for use of this data, storage retention, etc. However, most implementations of the frameworks are being built from the point of the service, website, tool, or other service provider, rather than from the point of view of the PE. Accordingly, it would be useful to have a framework that provided access to the individual PE without requiring significant knowledge and/or work on the part of the PE.

BRIEF DESCRIPTION

In one aspect, a server for protecting consumer privacy is provided. The server includes a processor and a memory configured to store computer-executable instructions. When executed by the processor, the instructions cause the server to store a consumer privacy preference storage for a plurality of privacy preferences associated with a plurality of consumers. The instructions also cause the server to receive, from a consumer computer device associated with a consumer, an access request to access a service. The instructions further cause the server to receive a service privacy request storage for a plurality of service privacy requests for the service. In addition, the instructions cause the server to retrieve a consumer privacy preference storage associated with the consumer. Moreover, the instructions cause the server to retrieve a privacy preference associated with the consumer using the consumer privacy preference storage. In addition, the instructions cause the server to retrieve a privacy request associated with the service using the service privacy request storage. Furthermore, the server compares the privacy preference to the privacy request to determine if there are any conflicts. If there are no conflicts, the instructions cause the server to permit the consumer computer device to access the service. The server may have additional, less, or alternate functionality, including that discussed elsewhere herein.

In another aspect, a method for protecting consumer privacy is provided. The method is implemented by a computer device including at least one processor and at least one memory device. The method includes storing a consumer privacy preference storage for a plurality of privacy preferences associated with a plurality of consumers. The method also includes receiving, from a consumer computer device associated with a consumer, an access request to access a service. The method further includes receiving a service privacy request storage for a plurality of privacy requests for the service. In addition, the method includes retrieving a consumer privacy preference storage associated with the consumer. Moreover, the method includes retrieving a privacy preference associated with the consumer using the consumer privacy preference storage. Furthermore, the method includes retrieving a privacy request associated with the service using the service privacy request storage. In addition, the method also includes comparing the privacy preference to the privacy request to determine if there are any conflicts. If there are no conflicts, the method includes permitting the consumer computer device to access the service. The method may have additional, less, or alternate functionality, including that discussed elsewhere herein.

BRIEF DESCRIPTION OF THE DRAWINGS

Those of skill in the art will understand that the drawings, described below, are for illustrative purposes only. The drawings are not intended to limit the scope of the present teachings in any way.

Figure 1:
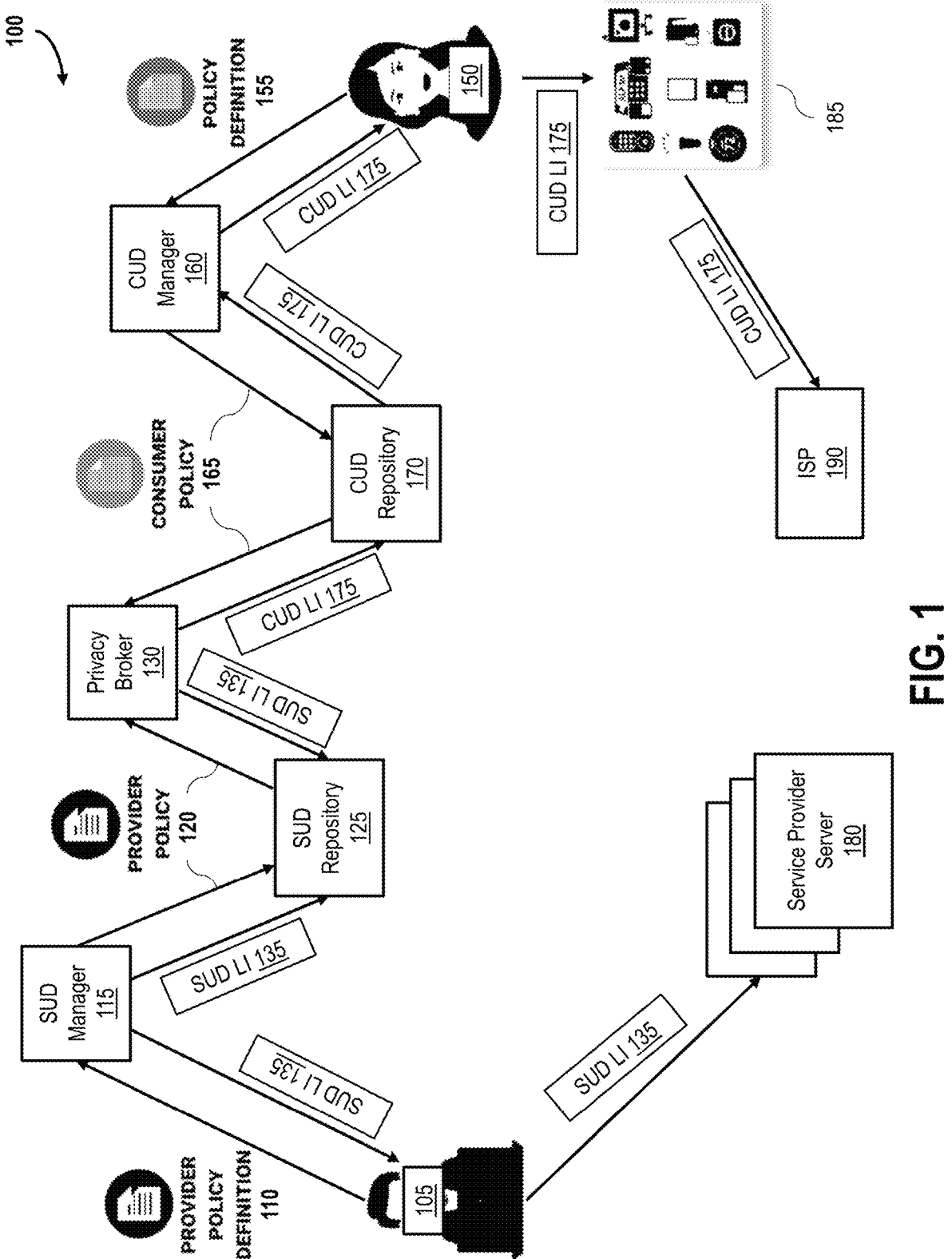
FIG. 1 illustrates a system for setting up privacy policies for service providers and consumers, in accordance with at least one embodiment.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

For the purposes of this discussion, an Access Control Entry (ACE) refers to an allowed or blocked descriptor for specific parties (systems, people, processes, or entities), which may be for a single item of data or a set of data. An Access Control List (ACL) is a collection of one or more ACEs which describe access restrictions.

For the purposes of this discussion, a Consumer refers to an individual or other regulation or legislatively protected entity. A Consumer Usage Description (CUD) is a listing of rules, preferences, and ACEs for a specific consumer. The preferences include which items of data the consumer is willing to provide and which items of data that the consumer is not willing to provide. Furthermore, different preferences may be included for different services and/or types of services. For example, a service for a map application or a restraint finder may have access to location information for the consumer, while a service for a chat program might not have access to the location information.

A CUD Creation Tool is a software program to allow a consumer to create, maintain, monitor, notify, update, review, and delete their PD and ACEs. In the exemplary embodiment, the CUD creation tool is a part of the CUD manager. A CUD file is a file containing the rules, preferences, and ACEs for the specific consumer. In at least one embodiment, the CUD file is YANG-based JSON that describes Protected Data (PD) and Protected Entities (PE) and associated requested specific application, session, and network behavior. A CUD repository hosts the CUD file. The CUD repository can include, but is not limited to, a CUD file server that is a web server that hosts a CUD file or a CUD ledger the is a distributed or local ledger that hosts CUD information or CUD files. In some embodiments, the CUD ledger can be considered a specialized type of CUD file server. A CUD ledger node is a node participating in a CUD distributed ledger which can perform trusted operations on the distributed ledger to retrieve information.

A CUD manager is the system that requests and receives the CUD file from the CUD repository. In some embodiment, the CUD manager processes the CUD file and then directs or restricts application, session, or network elements from behaviors defined by the CUD file. The CUD manager can also assist the consumer in creating, maintaining, monitoring, notifying, and/or updating the CUD file, such as through a CUD creation tool. A CUD location identifier (LI) is a unique sequence of characters that identifies a logical or physical resource. This can include a URL (uniform resource location), a URI (uniform resource indicator), or any other identifier of the location of the CUD file. The CUD LI can be used by the CUD manager to retrieve the CUD file. The CUD LI may point to a CUD repository, such as a CUD file server, a CUD ledger, or a CUD ledger node.

A SUD manager acts similar to the CUD manager, but is designed and designated for the service side, rather than the consumer side. The SUD manager requests and receives a SUD file from a SUD repository. The SUD file contains a list of rules and requests for the items of data that the service provider will collect and store from the consumer. The requests include which items of data the service is requesting from the consumer. The SUD file includes which conflicts between its rules and those in the CUD that can be overruled by the CUD. Also the SUD file may contain information about information already collected from different consumers and how long that information may be stored. A SUD location identifier (LI) is a unique sequence of characters that identifies a logical or physical resource. This can include a URL (uniform resource location), a URI (uniform resource indicator), or any other identifier of the location of the SUD file. The SUD LI can be used by the SUD manager to retrieve the SUD file. The SUD LI may point to a SUD repository, such as a SUD file server, a SUD ledger, or a SUD ledger node.

A privacy broker may also request and receive CUD files and/or SUD files from the repository. In some embodiment, the privacy broker processes the CUD file and/or the SUD file and then directs or restricts application, session, or network elements from behaviors defined by the CUD file and/or SUD file. The privacy broker can also assist the consumer in creating, maintaining, monitoring, notifying, and/or updating the CUD file. The privacy broker can also assist the service provider in creating, maintaining, monitoring, notifying, and/or updating the SUD file. The CUD LI can be used by the privacy broker to retrieve the CUD file. The CUD LI may point to a CUD repository, such as a CUD file server, a CUD ledger, or a CUD ledger node. The SUD LI can be used by the privacy broker to retrieve the SUD file. The SUD LI may point to a SUD repository, such as a SUD file server, a SUD ledger, or a SUD ledger node. In some of these embodiments, the privacy broker replaces one or more of the CUD manager and/or the SUD manager.

For the purposes of this discussion, Protected Data (PD) includes any datum or data describing or created by or about a Protected Entity which is created, inferred, shared, traded, stored, retained, retrieved, parsed, updated, deleted, or about which notifications are to be sent which is subject to any data protection or privacy controls.

A Protected Entity (PE) includes any system, thing, or person about which there is a relation to Protected Data. The Protected Entity may or may not be specifically covered by any data protection or privacy protecting legislative or regulatory compliance in any particular jurisdiction, this is any entity that may, at some point in the past, future, or present potentially or actually be subject to those legal frameworks.

The field of the invention relates generally to data privacy protection, and more particularly, to systems and methods for using consumer defined privacy policies with service defined privacy policies. More specifically, the systems and methods described herein outline an Individual Information Description Language (IIDL) to be used for standardizing communications about PD. The IIDL provides a framework for the creation and continued extension of the ontology of PD against which either an individual or an automated system could parse. The objective is to define a language for adding to this repository over time and against which the Consumer Usage Description (CUD) may specify usage.

The CUD intends to inform privacy and data protection decisions at the network, session, and application layers for Protected Entities (PEs), provide authentication for involved parties, authorization for use of PD, sharing of PD, lookup and access, retention requirements, removal (aka "Right to be Forgotten"), updating, notifications of changes, and auditing of these different authorizations, which itself actually becomes PD in turn as well. The CUD describes several components, these can be used in whole or in part, as well as any combination that supports the trustable management of PD in compliance with the CUD and IIDL.

The objective of the IIDL is to create an ontology of privacy and data-protection attributes related to individuals or other regulation or legislatively Protected Entities (PE). The CUD describes how manual or autonomous systems can utilize the IIDL and create the means through which PEs can signal application, session and network behavior required to protect this information. Protection of this information includes authentication of parties to which sharing is designated, authorization, access, and auditing.

In at least one embodiment, the CUD or SUD based on the Individual Information Description Language (IIDL) can be created in the format of JSON, as described in IETF (Internet Engineering Task Force) RFC8259 (Request for Comments), for the portable representation of structured data. However other formats for data could be used in other implementations, including, but on limited to, XML. As used herein, the IIDL is used to create the Consumer Usage Description (CUD). The IIDL can be implemented using the YANG modeling language.

There are multiple ways that systems can find the CUD Policy file for an individual. In at least one embodiment, the consumer can specify their CUD file by presenting the corresponding CUD LI, wherein the CUD file is stored. In some embodiment, the CUD file may be encrypted, and the individual could also provide the decryption key or the location of the decryption key along with the CUD LI. Systems that have access to PD SHOULD request the CUD LI or have a mechanism to lookup the CUD LI from the consumer. Applications can keep the CUD LI with the user's profile. Authenticated Sessions can exchange the CUD LI in the authentication handshake. Network layer protocols can include the CUD LI in the digital certificate exchange as an X.509 constraint. The certificate can be communicated over several protocol exchanges, including, but not limited to, the Tunnel Extensible Authentication Protocol (TEAP) as described in RFC7170. For security, the CUD LI's may use the "https" scheme as described in RFC7230.

To create transactions related to the CUD, the consumer's own verification can be used. For read transactions, the risk is low that someone would specify another consumer's CUD file as it relates to how a system stores information about them. CUD managers verify create and read transactions. Notify transactions could be misused, and if notify is supported, CUD managers could also verify those transactions.

To create transactions related to the CUD, such as read, write, and notify transactions, the user or service authorization can be implemented. For read transactions, the reader may be authenticated and authorized depending on the security policies of both the CUD file repository and the CUD file being requested. For write and notification subscription transactions, the CUD manager could authenticate the user.

In some embodiment, CUD/SUD managers or privacy broker are configured to retrieve CUD/SUD LIs and signature files as per RFC7230, using the GET method described in RFC7231. The CUD/SUD managers or privacy broker can then validate the certificate, such as by using the rules in RFC2818, Section 3.1.

In a example, a PE named Alice wishes to publish how she wishes for her PD to be handled. Alice uses a CUD creation tool to define defaults for creation, read, update, deletion, and notification of her PD into a CUD file. Alice then registers her CUD file with a CUD file server, CUD ledger or CUD ledger node. This step may be facilitated through zero or many third parties that help to coordinate this action including but not limited to, her internet service provider, her phone manufacturer, a social networking site, an internet portal that can identify consumers individually, her single-sign-on system, her employer, or perhaps her bank or insurance provider.

Alice's CUD is then normalized using the IIDL or other nomenclature for PD and recorded and indexed in the CUD file server or CUD ledger. As the last step of this creation and registration, Alice is presented the CUD LI which will uniquely identify her CUD file. This CUD LI can also be shared with other people and systems, such as those listed above or others.

Systems that Alice interacts with will need to retain this LI and associate it with Alice's account. This limits her need to remember and track this LI. In the exemplary embodiment, the LI is unique and not associated with other information that may be unique to Alice.

In this example, Alice decides to enter a sweepstakes with Beta Advertising for a chance to win a prize. The entry form collects information about Alice. The information within this form includes at least one item of PD. Alice identifies her CUD LI to be used with this data. The means she uses to identify the CUD LI can be direct or intermediated by other parties or by other lookup means (e.g., presenting a QR code to the system, emailing, writing a letter, text, spoken word, or even lookup based on hashed biometric information or by some combination of Alice's name and zero or more additional pieces of information).

Beta Advertising, as the entity administering the sweepstakes in this example, presents its policy for data collections, e.g., indicating by using the SUD LI. The CUD LI and the SUD LI are presented to the privacy broker. The privacy broker lookups Alice's CUD file via Alice's CUD LI and request that CUD file from the CUD fileserver, CUD ledger, or CUD ledger node. The privacy broker also processes the SUD file and directs or restricts application, session, or network elements from behaviors defined by the CUD file.

In this example, for this sweepstakes, Alice agrees to the collection of her demographic information (age, gender, and postal code). She is explicitly granting Beta Advertising permission to use this information internally and to share with direct partners for the period of 120 days. This change is then made to Alice's CUD file. Optionally the change could also be saved to Beta Advertising's CUD file. Both changes could be signed by Beta Advertising, and optionally by Alice or her systems. The updated CUD files (Alice's and Beta Advertising's) are then uploaded by the CUD manager to the corresponding CUD LIs, such as through using a RESTful (Push) method to append data to Beta Advertising's CUD file and to Alice's CUD file.

In an alternative example scenario, Alice visits a web search within a portal and that site has a means to identify Alice (by browser fingerprinting, cookies, linked accounts, IP address, or other means). Alice performs a search. That search is then retained and linked to Alice. The searches are considered PD and therefore are subject to Alice's CUD.

Furthermore, the systems and methods described herein can be modified to be used to allow the networks to uniquely authenticate devices regardless of where the devices are located. The networks will offer contextual information to the applications so that the applications can offer unique services to the consumers.

This system and method offers security services to support seamless consumer experiences in converged networks. This can include, but is not limited to, device Identity (immutable, attestable, globally unique id for every device engaging in the converged use case), use identity, consumer Identity (who is the PERSON at the center of the use case, consider security and privacy of data related to this), and Contextual Awareness (what/where/how is this happening, who else is in the engagement, what devices do they have, how is privacy being protected, how are integrity and confidentiality being secured, how is billing being managed). This can be illustrated more fully in the use cases below.

The problems being solved is the lack of device authentication in fixed networks, the lack of coordination of device and consumer authentication, and the lack of contextual information in consumer authentication. Without proper and sufficient authentication, seamless consumer experience cannot be accomplished.

More specifically, in fixed access networks such as HFC and DSL, the residential gateways are authenticated by the network but the devices behind the residential gateways are NOT authenticated. The lack of device authentication in fixed networks limits both the quality of services and security protections that can be offered to the devices.

In mobile networks, devices are authenticated by the network (e.g., based on USIM credentials), which allows the devices to be offered unique quality of services and security protections (e.g., traffic encryption from the devices to the networks). However, there is no coordination between the devices and the consumers of the devices.

Consumers are authenticated by applications without any contextual information about the devices the consumers are using or the locations where the consumers are from. This limits the services that can be offered to the consumers by the applications. Note that applications can be offered by the network operators or third parties (e.g., a cloud service provider).

New services can be offered by both network operators and application providers. The following use cases use the Wang family, a family of 6 people: mom (Alice), dad (Bob), a boy (Peter), a girl (Lily), grandpa and grandma. The use cases follow them and their normal activities to illustrate the use cases and new services that can be enabled by this solution.

Seamless On-boarding (new home): In the post-pandemic world, Alice and Bob can now work from anywhere. Alice and Bob decide to move out of the city and into the suburbs with a larger house with a yard. Fortunately, the new house is in an area that is served by their current cable provider, Fast Cable. Fast Cable is able to automatically configure all devices (laptop, phones, tablets, smart TV, home monitoring devices, etc.) without requiring any manual configuration by any family member.

Seamless On-boarding (Medical)—Bob wants to be able to receive medical health care from anywhere his physician needs to monitor his health conditions from anywhere. Example: Bob caught Covid-19 in July and his doctor sent him home with a pulse-oximeter to monitor his blood oxygen levels. The pulse-oximeter device he was provided has four different types of radios, 2.4 GHz Wi-Fi, 5 GHz Wi-Fi, Bluetooth LE, and LTE. Bob scans the QR code on the device with his phone in the doctor's office and through the Bluetooth connection, the phone configures both the Wi-Fi and the eSIM on the device and connects it to a cloud service from Bob's Cable Provider, Fast Cable. Bob is able to use the device right away after returning home without the need to do any further provisioning.

Seamless On-boarding (Vacation): Bob books a rental property for his vacation, which is also a customer of Fast Cable (or has a cable roaming agreement with Fast Cable). When Bob arrives at the rental home, his phones and other devices automatically connect to the Wi-Fi in the rental property which has been pre-configured by the network provider. The smart TV in the rental room has also been pre-configured with all the favorite channels that Bob used to watch from his home. The smart speakers in the rental room can also recognize Bob's voice and can respond to Bob's commands.

Seamless QoS: Due to the weather, the entire family all stay home today. Dad and mom are working from home. The children are doing online schools. The grandpa is playing a video game on the phone over Wi-Fi, and the grandma is watching TV. Although they are all using the Internet from different devices with different applications, they do not feel any network interference because each device is provided with its own quality of service.

Seamless Online Community (Virtual LAN): When the boy, Peter, logs into his virtual classroom, the virtual classroom cloud provider VClass authenticates Peter and obtain his network provider information. VClass invokes the service interfaces offered by Fast Cable to automatically join Peter and other students into a virtual LAN.

Seamless Security: When Bob works from home, the corporate security policies are automatically applied by the Fast Cable to ensure that Bob is offered the same protection as he works from office.

Seamless Parental Control: Because the Wangs subscribe to the enhanced Fast Cable Security service each member has a profile stored in the Wang family account. This profile allows for dynamic allocation of credentials that can be used on devices. For multi-consumer device this credential is presented when that consumer logs in. This enables the device's complete security stance on the network to change based on the currently active consumer, parental controls, and custom network priorities to follow the consumer regardless of the device they are using.

Seamless Mobility: Alice goes to the office three days a week and works from home two days a week. Alice also travels once every month. Alice's employer wants to ensure that corporate information assets are always protected with the same level of security regardless of the location where Alice conducts her work. When Alice is working from outside of the office, the security policy applied at the corporate firewall travels with Alice and is automatically applied at the access network (e.g., the cable modem, CMTS, or base stations) where she connects to the network.

Seamless Monitoring: Alice wants to be guaranteed of safety and security of her loved ones, properties, vehicles, financial assets, pets, etc. She wants to be able to monitor her everything from everywhere (from both within and outside home). When some incidents occur, Alice wants to be alerted regardless of where she is.

For the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems."

Furthermore, the DOCSIS protocol may be substituted with, or further include protocols such as EPON, RFOG, GPON, Satellite Internet Protocol, without departing from the scope of the embodiments herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

FIG. 1 illustrates a system 100 for setting up privacy policies for service providers 105 and consumers 150, in accordance with at least one embodiment. In the exemplary embodiment, the service provider 105 is using a service provider computer device 305 (shown in FIG. 3) and the consumer 150 is using a consumer computer device 405 (shown in FIG. 4). A service provider 105 is associated with at service provider server 180 that provides a service, website, tool, or other web service to consumers. In at least one embodiment, the service provider 105 may be associated with an Internet of Things (IoT) device, such as, but not limited to, a smart thermostat or IP camera. The service provider 105 may provide updates, services, and/or updates to the IoT device.

In the exemplary embodiment, the service provider 105 sets up a Service Usage Description (SUD). The SUD includes a plurality of rules and requests for items of data of the consumer 150 that the service provider 105 is collecting. To build the SUD, the service provider 105 uses the service provider computer device 305 to provide provider policy definitions 110 to a SUD manager 115. In some embodiments, the SUD manager 115 provides a user interface 910 (shown in FIG. 9), such as a webpage, that allows the service provider 105 to choose the data items to be collected from the consumer 150. In other embodiments, the SUD manager 115 receives a file containing the provider policy definitions 110. The SUD manager 115 uses the provider policy definitions 110 to generate a provider policy 120. In the exemplary embodiment, the provider policy 120 is in a SUD file, which is formatted similarly to the CUD file 610 (shown in FIG. 6). The SUD manager 115 transmits the provider policy 120 to a SUD repository 125. In some embodiments, the SUD repository 125 is similar to a CUD repository and stores the SUD file. In at least one embodiment, the SUD repository 125 provides a SUD location identifier (LI) 135 to the location of the SUD file to a privacy broker 130. In other embodiments, the SUD repository 125 stores a copy of the SUD file and provides another copy of the SUD file to the privacy broker 130 to store. In these embodiments, the privacy broker 130 stores the SUD file and provides the SUD LI 135 to where the SUD file is stored. In some of these embodiments, the SUD file is encrypted, and the SUD LI 135 includes a decryption key or a link to the location of a decryption key. The SUD LI 135 is provided to the service provider 105 and their service provider computer device 305. In the exemplary embodiment, after the service provider 105 receives their SUD LI 135, the SUD LI 135 is provided to one or more service provider servers 180, which are the devices providing the corresponding webservice and collecting the items of data from the consumer 150.

In the exemplary embodiment, the consumer 150 sets up a Consumer Usage Description (SUD). The CUD includes a plurality of rules and preferences about items of data of the consumer 150 that the consumer 150 will and will not allow service providers 105 to collect. To build the CUD, the consumer uses the consumer computer device 405 to provide consumer policy definitions 155 to a CUD manager 160. In some embodiments, the CUD manager 160 provides a user interface 910, such as a webpage, that allows the consumer 150 to choose the data items to be collected from the consumer 150. In other embodiments, the CUD manager 160 receives a file containing the consumer policy definitions 155. The CUD manager 160 uses the consumer policy definitions 155 to generate a consumer policy 165. In the exemplary embodiment, the consumer policy 165 is in a CUD file 610. The CUD manager 160 transmits the consumer policy 165 to a CUD repository 170. In some embodiments, the CUD repository 170 stores the CUD file 610. In at least one embodiment, the CUD repository 170 provides a CUD LI 175 to the location of the SUD file to the privacy broker 130. In other embodiments, the CUD repository 170 stores a copy of the CUD file 610 and provides another copy of the CUD file 610 to the privacy broker 130 to store. In these embodiments, the privacy broker 130 stores the CUD file 610 and provides the CUD LI 175 to where the CUD file 610 is stored. In some of these embodiments, the CUD file 610 is encrypted and the CUD LI 175 includes a decryption key or a link to the location of a decryption key. The CUD LI 175 is provided to the consumer 150 and their consumer computer device 405. In the exemplary embodiment, after the consumer receives their CUD LI 175, the CUD LI 175 is provided to one or more devices 185 of the consumer 150. The devices 185 can include, but are not limited to, IoT devices, mobile computer devices, and other Internet connected devices. Furthermore, the CUD LI 175 can also be forwarded to the consumer's ISP (Internet Service Provider) 190.

In some further embodiments, the privacy broker 130 includes one or both the SUD repository 125 and the CUD repository 170. In these embodiments, the privacy broker 130 performs the appropriate steps as described herein.

Figure 2:
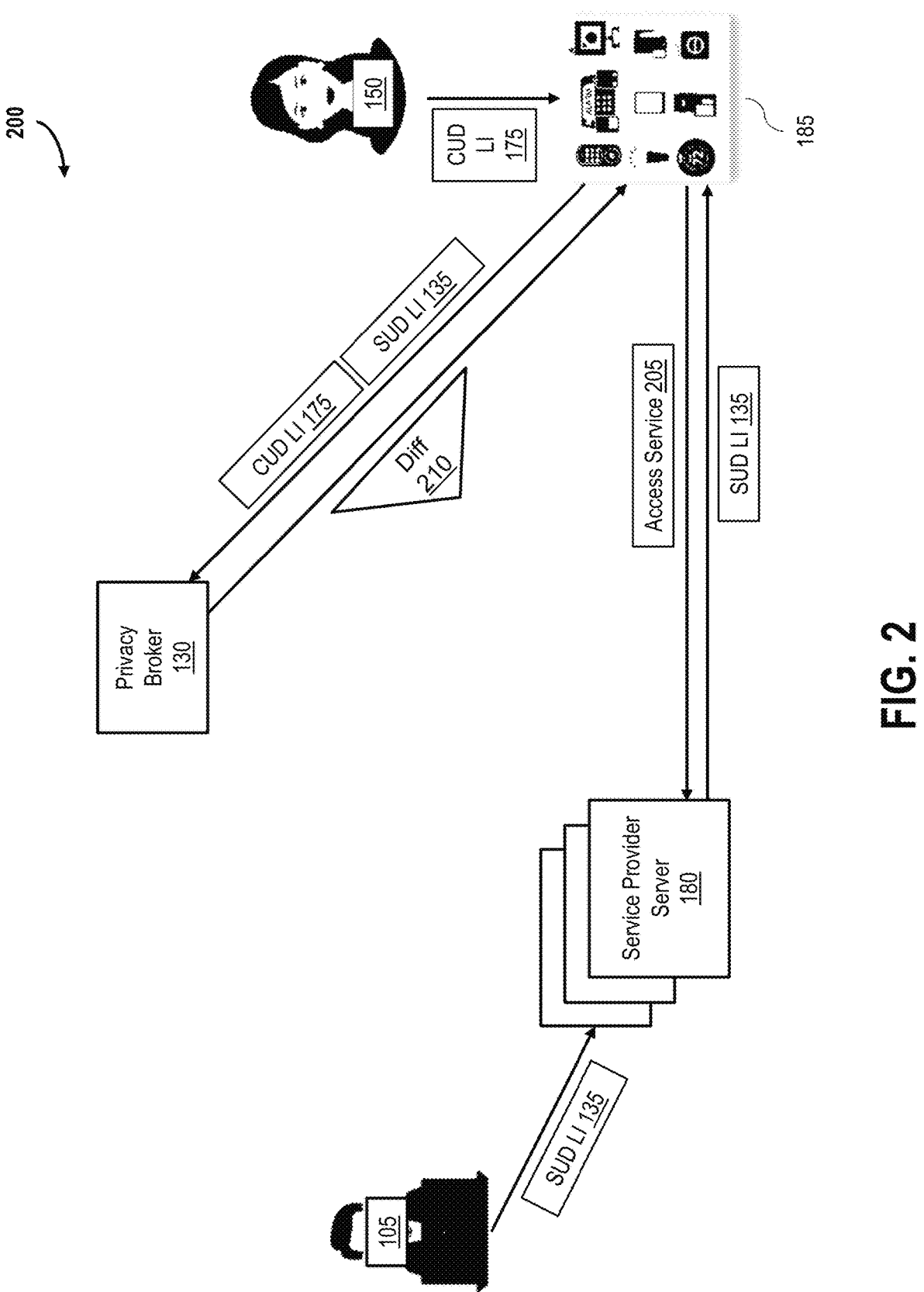
FIG. 2 illustrates a system for using and comparing privacy policies for service providers and consumers, in accordance with at least one embodiment.

FIG. 2 illustrates a system 200 for using and comparing privacy policies for service providers 105 and consumers 150, in accordance with at least one embodiment. In the exemplary embodiment, the service provider 105 is using a service provider computer device 305 (shown in FIG. 3) and the consumer 150 is using a consumer computer device 405 (shown in FIG. 4).

In the exemplary embodiment, the consumer 150, through one of their devices 185, attempts to access a service associated with the service provider 105, potentially for the first time. The device 185 transmits an access service request 205 to the service provider server 180. The service provider server 180 responds with their SUD LI 135. The device 185 receives the SUD LI 135. The device 185 then transmits the SUD LI 135 and the CUD LI 175 to the privacy broker 130. The privacy broker 130 retrieves the SUD and the CUD using their corresponding LIs 135 and 175. Then the privacy broker 130 compares the SUD to the CUD. More specifically, the privacy broker 130 determines which items of data that the service provider 105 is collecting and then determines whether or not the consumer 150 will allow those items of data to be collected. The privacy broker 130 then returns the differences 210 to the device 185. If there is no conflict between the SUD and the CUD, the device 185 then provides the requested items of data to the service provider server 180. In some embodiments, the items of data are stored in the CUD and the privacy broker 130 provides the requested data to the device 185 along with the differences 210.

If there is a conflict, there are multiple different actions that may be taken. In a first situation, the device 185 decides to restrict access to the service provider 105 and the service provider server 180. In a second situation, the device 185 provides all of the items of data except those with conflicts to the service provider server 180. The service provider server 180 then decides whether or not to proceed only with the provided information. In a third situation, the device 185 may ask the consumer 150 if they are willing to allow the conflicted items of data to be transmitted to the service provider 105. If the consumer 150 agrees then the device 185 transmits the corresponding items of data to the service provider server 180. In some embodiments, the privacy broker 130 does not provide the conflicted items of data to the device 185, but instead waits until the consumer 150 approves the release of those items of data. In the exemplary embodiment, if the consumer 150 allows the items of data to be collected by the service provider 105, the privacy broker 130 updates the CUD file 610 (shown in FIG. 6) with the service provider 105 information and the information collected. The service provider 105 may also update the SUD file with the information collected and any restrictions on the use of that data.

In some embodiments, the service provider server 180 receives the differences 210 instead of the device 185. In these embodiments, the service provider server 180 then determines whether or not to proceed. The service provider server 180 can proceed with only those items of data that are not conflicted. The service provider server 180 can also proceed with all of the requested information, ignoring the differences and/or conflicts. In some embodiments, there may be an audit later, such as by a governmental and/or watchdog entity that may discover this action. In some of these embodiments, the service provider server 180 ignores conflicts for all items of data that are not restricted by local regulations.

The device 185 and/or the service provider server 180 may take any of the above actions and/or any other combination of those actions. Furthermore, these actions may also be taken by the privacy broker 130, the SUD manager 115, and/or the CUD manager 160. In addition, the device 185 and/or the service provider server 180 may also take other actions based on the programming of each computer device, also including the privacy broker 130, the SUD manager 115, and/or the CUD manager 160.

In some embodiment, the privacy broker 130 is replaced with the CUD manager 160 (shown in FIG. 1). In other embodiments, the privacy broker 130 is part of the CUD manager 160, or vice versa. The CUD manager 160 retrieves the CUD file 610 from the CUD repository 170 (shown in FIG. 1) and performs the comparison and provides the differences 210.

In some further embodiments, the device 185 provides CUD LI 175 to the service provider server 180 as a part of the access service request 205. The service provider server 180 then contacts the privacy broker 130 to compare the SUD LI 135 and the CUD LI 175. In still additional embodiments, the service provider server 180 reaches out to the CUD repository 170 to retrieve the CUD file 610. Then the service provider server 180 performs the comparison. If there is a conflict, then the service provider server 180 transmits a request to overturn the conflict to the consumer 150 via the device 185.

Figure 3:
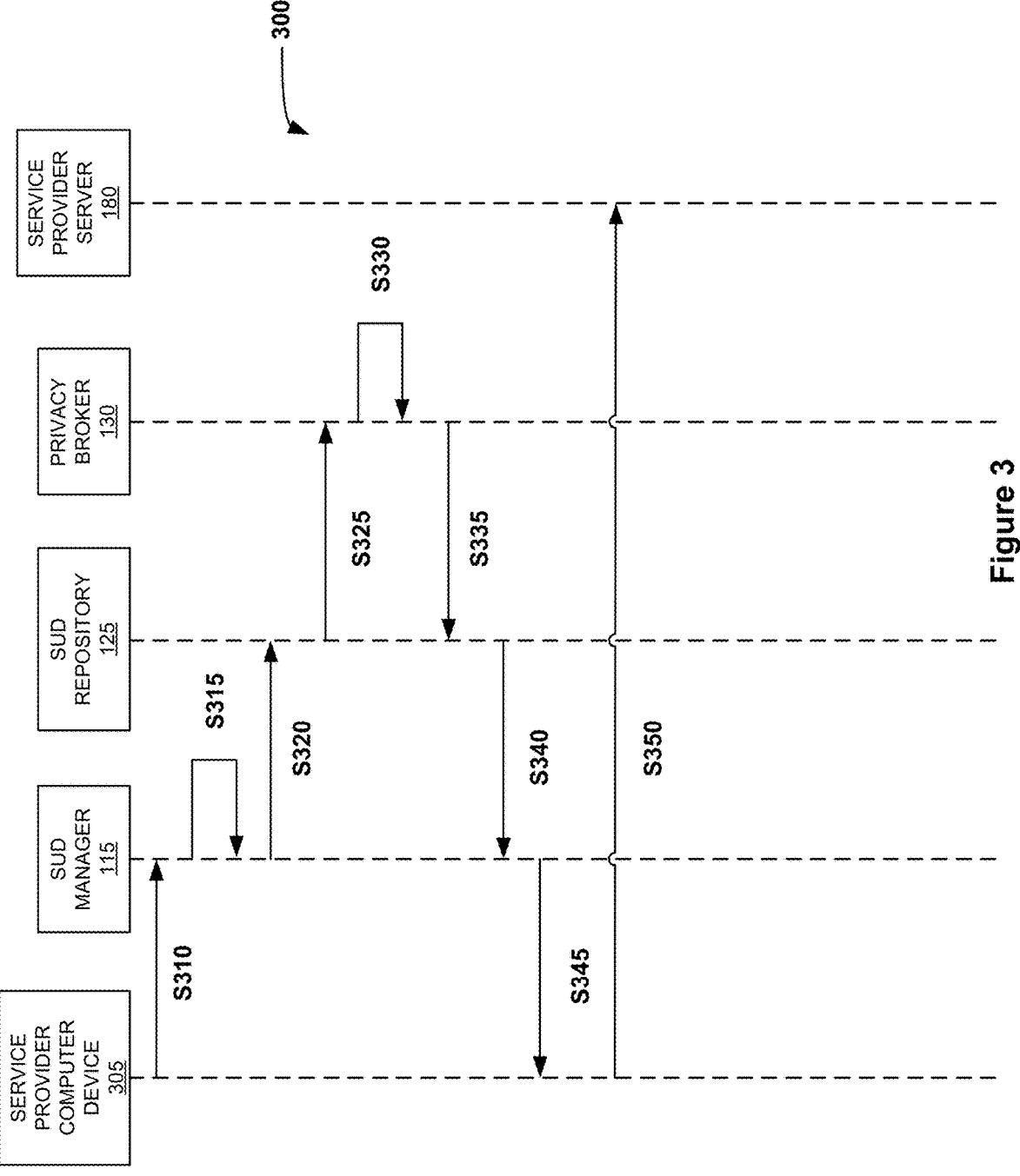
FIG. 3 illustrates a timing diagram for a process for building and storing a SUD using the system shown in FIG. 1.

FIG. 3 illustrates a timing diagram for a process 300 for building and storing a SUD using the system 100 (shown in FIG. 1). In the exemplary embodiment, a service provider 105 (shown in FIG. 1) is using a service provider computer device 305.

In step S310, the service provider computer device 305 communicates with the SUD manager 115 to generate the SUD in a SUD file. In some embodiments, the SUD manager 115 provides a user interface 910 (shown in FIG. 9) to the service provider 105 via the service provider computer device 305 that allows the service provider 105 to provide the provider policy definitions 110 (shown in FIG. 1). The provider policy definitions 110 include the items of data that the service provider 105 will collect from consumers 150 (shown in FIG. 1). In some embodiments, the SUD manager 115 also allows the service provider computer device 305 to update and/or change an existing SUD file.

In Step S315, the SUD manager 115 generates the SUD file, which includes a plurality of provider policies 120 (shown in FIG. 1). In Step S320, the SUD manager 115 provides the provider policies 120 and/or SUD file to the SUD repository 125. The SUD repository 125 stores the provider policies 120 and/or SUD file. In some embodiments, the SUD repository 125 generates a SUD LI 135 for the stored SUD file. In Step S325, the SUD repository 125 transmits the provider policies 120 and/or SUD file to the privacy broker 130. In Step S330, the privacy broker 130 stores the SUD file and generates the SUD LI 135. In Step S335, the privacy broker 130 provides the SUD LI 135 to the SUD repository 125. In Step S340, the SUD repository 125 provides the SUD LI 135 to the SUD manager 115. In Step S345, the SUD manager 115 provides the SUD LI 135 to the service provider computer device 305. In Step S350, the service provider computer device 305 provides the SUD LI 135 to the service provider server 180

In the exemplary embodiment, the SUD file is encrypted, and the SUD LI 135 includes information about how to decrypt the SUD file. The decryption information could include the decryption key and/or the location of a decryption key.

In some further embodiments, the SUD repository 125 provides the SUD LI 135 to the privacy broker 130. In some embodiments, the SUD repository 125 and the privacy broker 130 each provide different SUD LIs 135 to where they have each stored a copy of the SUD file.

Figure 4:
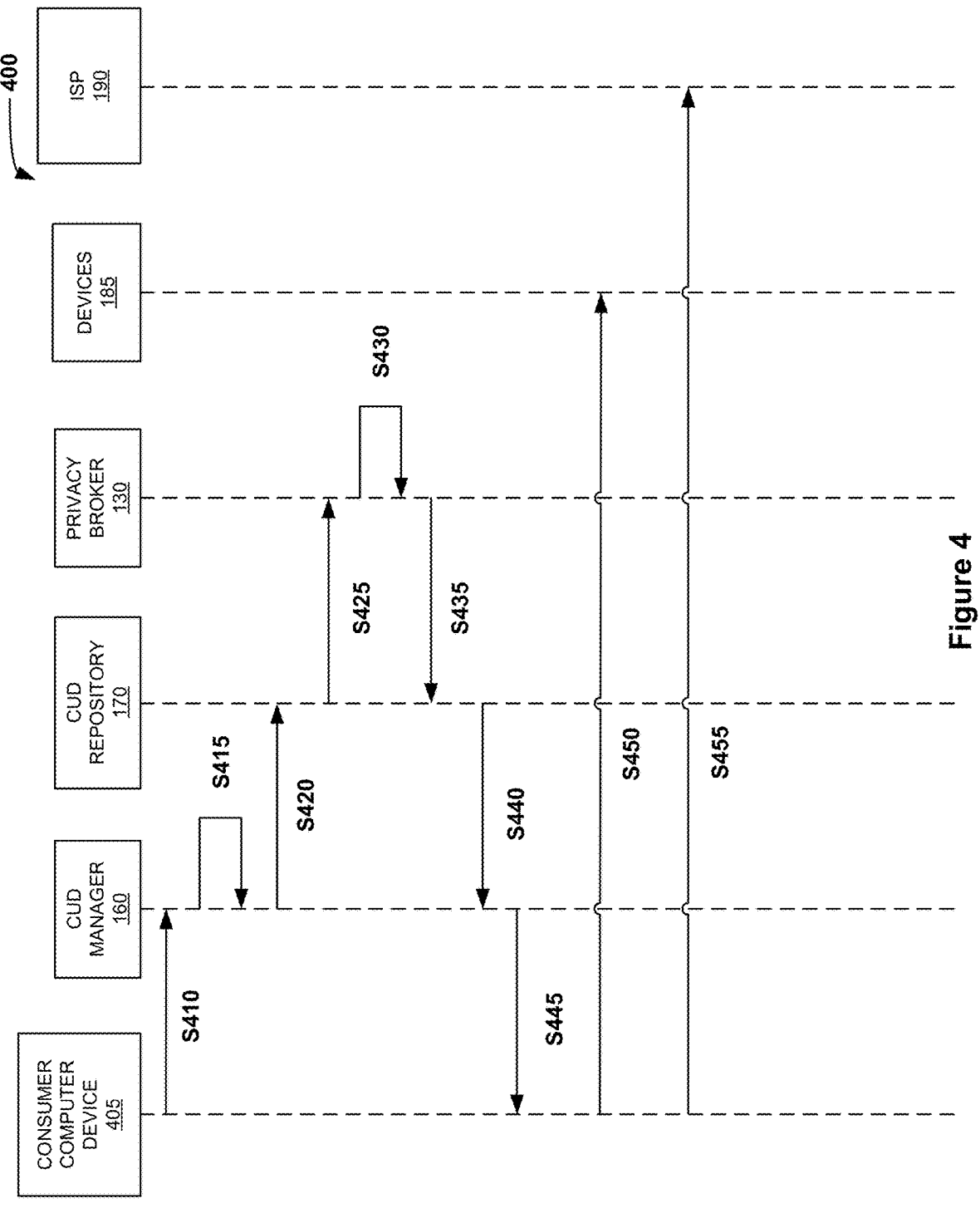
FIG. 4 illustrates a timing diagram for a process for building and storing a CUD using the system shown in FIG. 1.

FIG. 4 illustrates a timing diagram for a process 400 for building and storing a CUD using the system 100 (shown in FIG. 1). In the exemplary embodiment, a consumer 150 (shown in FIG. 1) is using a consumer computer device 405.

Figure 6:
FIG. 6 illustrates a flow of another system for creating a CUD file, in accordance with at least one embodiment.

In step S410, the consumer computer device 405 communicates with the CUD manager 160 to generate the CUD in a CUD file 610 (shown in FIG. 6). In some embodiments, the CUD manager 160 provides a user interface 910 (shown in FIG. 9) to the consumer 150 via the consumer computer device 405 that allows the consumer 150 to provide the consumer policy definitions 155 (shown in FIG. 1). The consumer policy definitions 155 include the items of data that the consumer 150 will allow service providers 105 to collect and which items of data that the service providers 105 cannot collect. The consumer policy definitions 155 may also include exceptions, such as websites that are allowed to collect specific items of data. In some embodiments, the CUD manager 160 also allows the consumer computer device 405 to update and/or change an existing CUD file 610.

In Step S415, the CUD manager 160 generates the CUD file 610, which includes a plurality of consumer policies 165 (shown in FIG. 1). In Step S420, the CUD manager 160 provides the consumer policies 165 and/or CUD file 610 to the CUD repository 170. The CUD repository 170 stores the consumer policies 165 and/or CUD file 610. In some embodiments, the CUD repository 170 generates a CUD LI 175 for the stored CUD file 610. In Step S425, the CUD repository 170 transmits the consumer policies 165 and/or CUD file 610 to the privacy broker 130. In Step S430, the privacy broker 130 stores the CUD file 610 and generates the CUD LI 175. In Step S435, the privacy broker 130 provides the CUD LI 175 to the CUD repository 170. In Step S440, the CUD repository 170 provides the CUD LI 175 to the CUD manager 160. In Step S445, the CUD manager 160 provides the CUD LI 175 to the consumer computer device 405. In Step S450, the consumer computer device 405 provides the CUD LI 175 to the devices 185 associated with the consumer 150. In Step S455, the consumer computer device 405 provides the CUD LI 175 to the ISP 190 associated with the consumer 150

In the exemplary embodiment, the CUD file 610 is encrypted and the CUD LI 175 includes information about how to decrypt the CUD file 610. The decryption information could include the decryption key and/or the location of a decryption key.

In some further embodiments, the CUD repository 170 provides the CUD LI 175 to the privacy broker 130. In some embodiments, the CUD repository 170 and the privacy broker 130 each provide different CUD LIs 175 to where they have each stored a copy of the CUD file 610.

Figure 5:
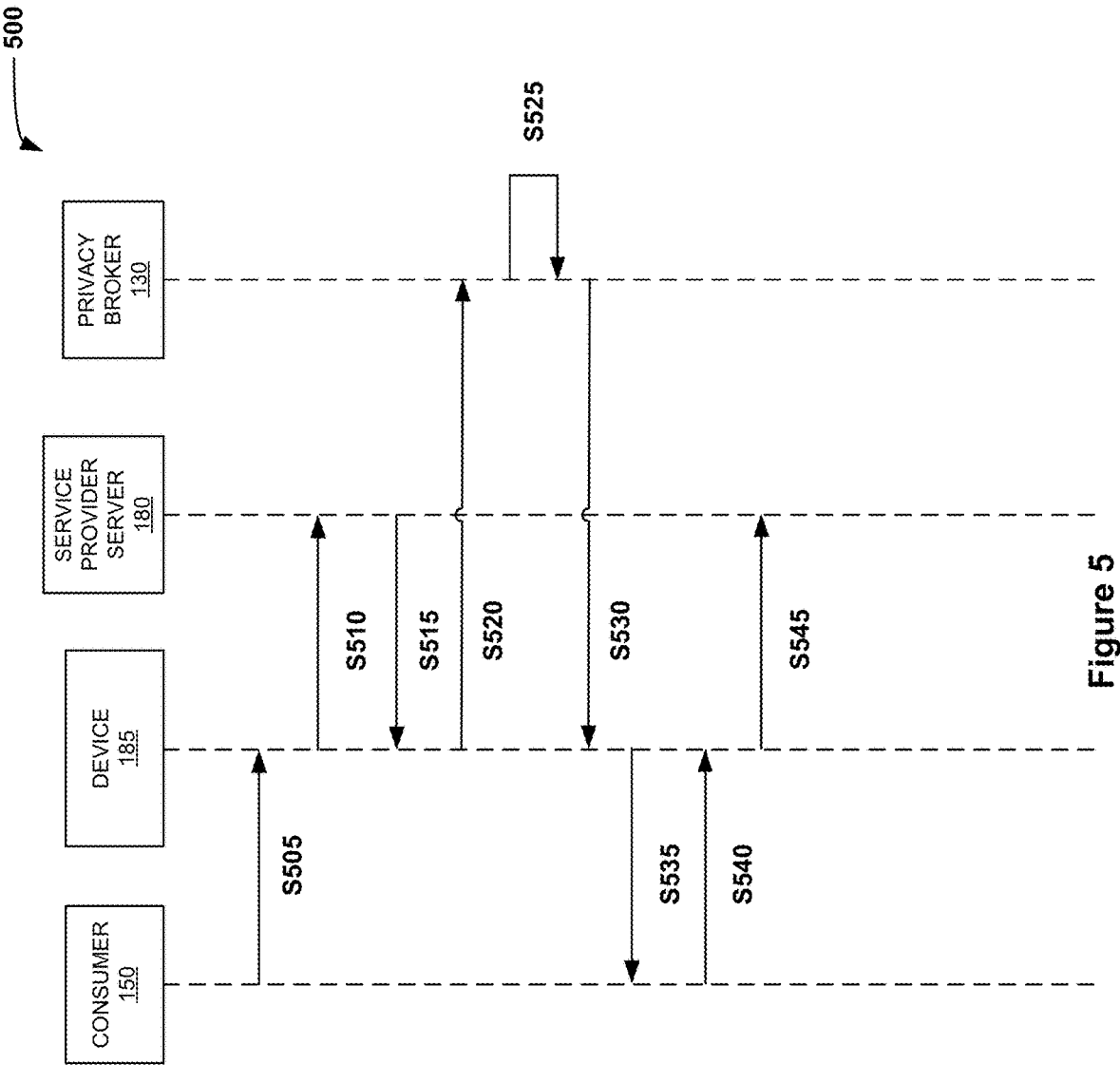
FIG. 5 illustrates a timing diagram for a process for access a service the system shown in FIG. 2.

FIG. 5 illustrates a timing diagram for a process 500 for access a service the system 200 (shown in FIG. 2).

In Step S505, the consumer 150 instructs a device 185 to access a service provider 105 (shown in FIG. 1). In Step S510, the devices 185 transmits an access service request 205 (shown in FIG. 2) to the service provider server 180. In response, in Step S515, the service provider server 180 transmits the SUD LI 135 (shown in FIG. 1) associated with the service provider 105. In Step S520, the device 185 transmits the SUD LI 135 and the CUD LI 175 (shown in FIG. 1) associated with the consumer 150 to the privacy broker 130. The privacy broker 130 uses the SUD LI 135 and CUD LI 175 to retrieve the SUD file and the CUD file 610 (shown in FIG. 6). In some embodiments, the SUD file and the CUD file 610 are stored by the privacy broker 130. In other embodiments, the SUD file and the CUD file 610 are stored by the SUD repository 125 and the CUD repository 170 (both shown in FIG. 1), respectively. In Step S525, the privacy broker 130 compares the SUD file and the CUD file 610 for differences. More specifically, the privacy broker 130 determines which items of data that the service provider 105 is collecting and then determines whether or not the consumer 150 will allow those items of data to be collected. In Step S530, the privacy broker 130 then returns the differences 210 to the device 185. If there is no conflict between the SUD and the CUD, the device 185 then provides the requested items of data to the service provider server 180, in Step S545. In some embodiments, the items of data are stored in the CUD and the privacy broker 130 provides the requested data to the device 185 along with the differences 210.

If there is a conflict, in Step S535, the device 185 may ask the consumer 150 if they are willing to allow the conflicted items of data to be transmitted to the service provider 105. In Step S540, the consumer 150 responds with either approval or denial of allowing the collection of the conflicted items of data. If the consumer 150 agrees, then in Step S545, the device 185 transmits the corresponding items of data to the service provider server 180. In some embodiments, the privacy broker 130 does not provide the conflicted items of data to the device 185, but instead waits until the consumer 150 approves the release of those items of data.

In the exemplary embodiment, if the consumer 150 allows the items of data to be collected by the service provider 105, the privacy broker 130 updates the CUD file 610 with the service provider 105 information and the information collected. The service provider 105 may also update the SUD file with the information collected and any restrictions on the use of that data.

In some embodiment, the privacy broker 130 is replaced with the CUD manager 160 (shown in FIG. 1). In other embodiments, the privacy broker 130 is part of the CUD manager 160, or vice versa. The CUD manager 160 retrieves the CUD file 610 from the CUD repository 170 (shown in FIG. 1) and performs the comparison and provides the differences 210, shown in Step S525.

FIG. 6 illustrates a flow of another system 600 for creating a CUD file 610, in accordance with at least one embodiment.

In the exemplary embodiment, Alice is a consumer 150. Alice 150 activates and registers with an application 605 to allow her to build a CUD file 610. In the exemplary embodiment, the application 605 is executing on the consumer computer device 405 (shown in FIG. 4). The application 605 is a CUD creation tool and provides Alice 150 with the tools to provide her privacy policy definitions 155 (shown in FIG. 1). The application 605 provides the privacy policy definitions 155 to the CUD manager 160. The CUD manager 160 uses the privacy policy definitions 155 to build the CUD file 610.

Then the CUD manager 160 accesses the CUD repository 170 through the Internet 615. The CUD repository 170 may include one or more of a CUD file server 620, a CUD ledger 625, and/or a CUD ledger node 630. A CUD file server 620 that is a web server that hosts a CUD file 610. A CUD ledger 625 the is a distributed or local ledger that hosts CUD information or CUD files 610. In some embodiments, the CUD ledger 625 can be considered a specialized type of CUD file server 620. A CUD ledger node 630 is a node participating in a CUD distributed ledger 625 which can perform trusted operations on the distributed ledger to retrieve information. The CUD repository 170 returns the CUD LI 175 for where the CUD file 610 was save. The CUD manager 160 provides the CUD LI 175 to the application 605 and application 605 stores the CUD LI 175 in Alice's account, such as in an application database 635.

In some embodiments, the application 605 that creates the CUD file 610 stores the authentication credentials used in the application database 635. This may include cryptographic material such as private or symmetric keys specific to Alice 150.

In other embodiments, the application 605 returns the credentials directly to Alice 150 and/or her consumer computer device 405, for her to store and/or manage.

Figure 7:
FIG. 7 illustrates a flow of another system for looking up a CUD file, in accordance with at least one embodiment.

FIG. 7 illustrates a flow of another system 700 for looking up a CUD file 610, in accordance with at least one embodiment.

Alice is a consumer 150 and logs in to an application 605. The application 605 looks up Alice's CUD LI 175 in the application database 635. The application 605 transmits the CUD LI 175 to the CUD manager 160. The CUD manager 160 uses the CUD LI 175 to retrieve the CUD file 610 from the CUD repository 170. The CUD manager 160 then parses the CUD file 610. Then the CUD manager 160 informs the application 605 of the permitted and restricted actions on Alice's PD.

Figure 8:
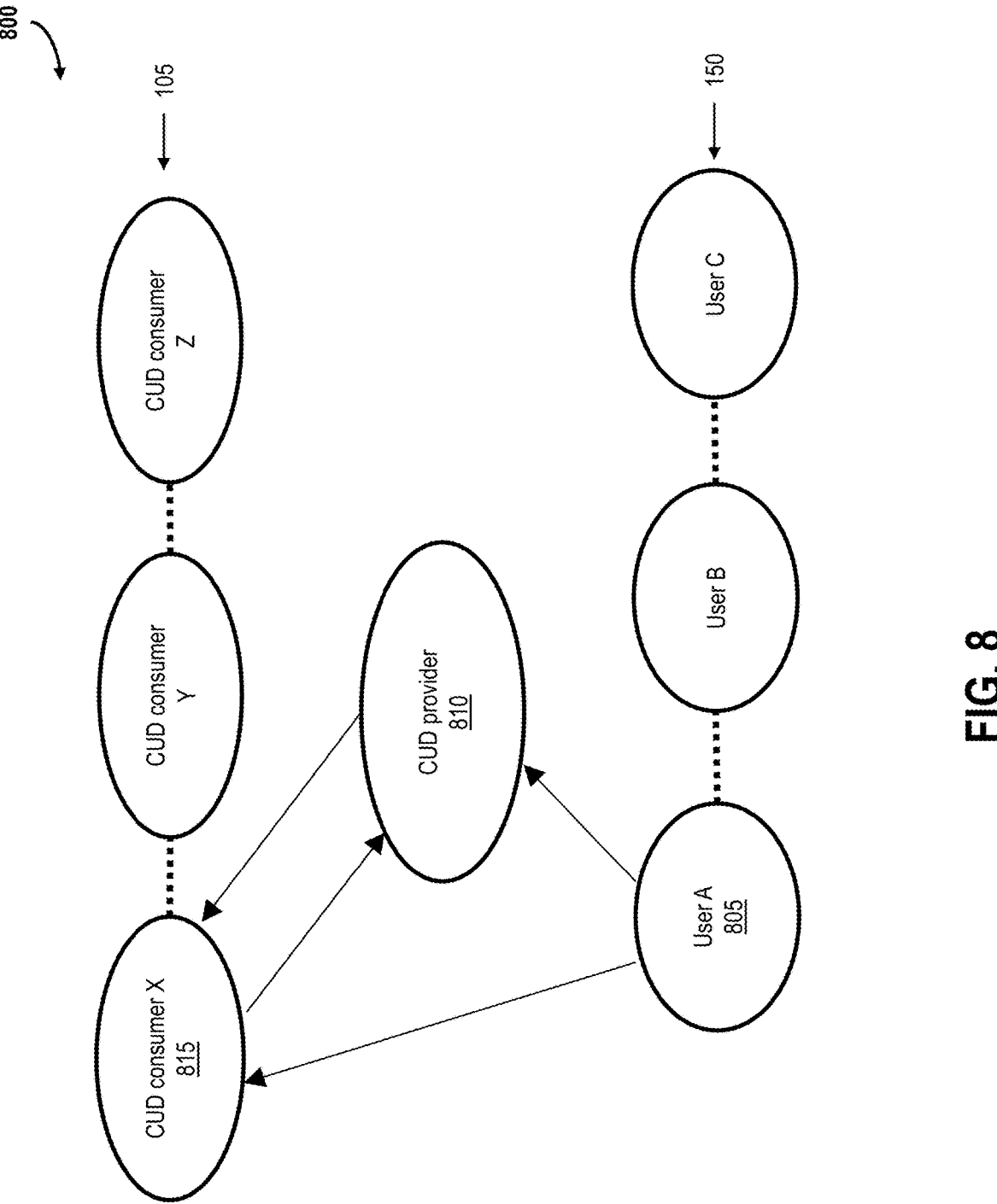
FIG. 8 illustrates a flow diagram for a further system in accordance with at least one embodiment of this disclosure.

FIG. 8 illustrates a flow diagram for a further system 800 in accordance with at least one embodiment of this disclosure. A consumer 805, which is similar to the consumer 150 (shown in FIG. 1) manages his/her consumer usage descriptions with a CUD provider 810 (e.g., its network operator), which returns the consumer 805 one or more CUD LIs 175 (shown in FIG. 1). A CUD LI 175 may contain randomized information to prevent linkage of the consumer 805 among multiple use of the LI (e.g., on multiple websites).

When the consumer 805 needs to use a service 105 which collects the consumer's information, the consumer 805 provides one CUD LI 175 to the service site X 815. The service site X 815 uses the consumer's CUD LI 175 to subscribe to the CUD provider 810. The service site X 815 may also tell CUD provider 810 what information it is collecting from the consumer 805 (not the actual information the consumer 805 provides to service site X 815). The CUD provider 810 returns the consumer's CUD (privacy rules and preferences) to the service site X 815, which now becomes the consumer 815 of the CUD provider 810. When the consumer 805 updates its CUD at CUD provider 810, the service site X 815 will automatically be notified with the change. This allows the consumer to revoke previously granted consent from the service site 815.

Figure 9:
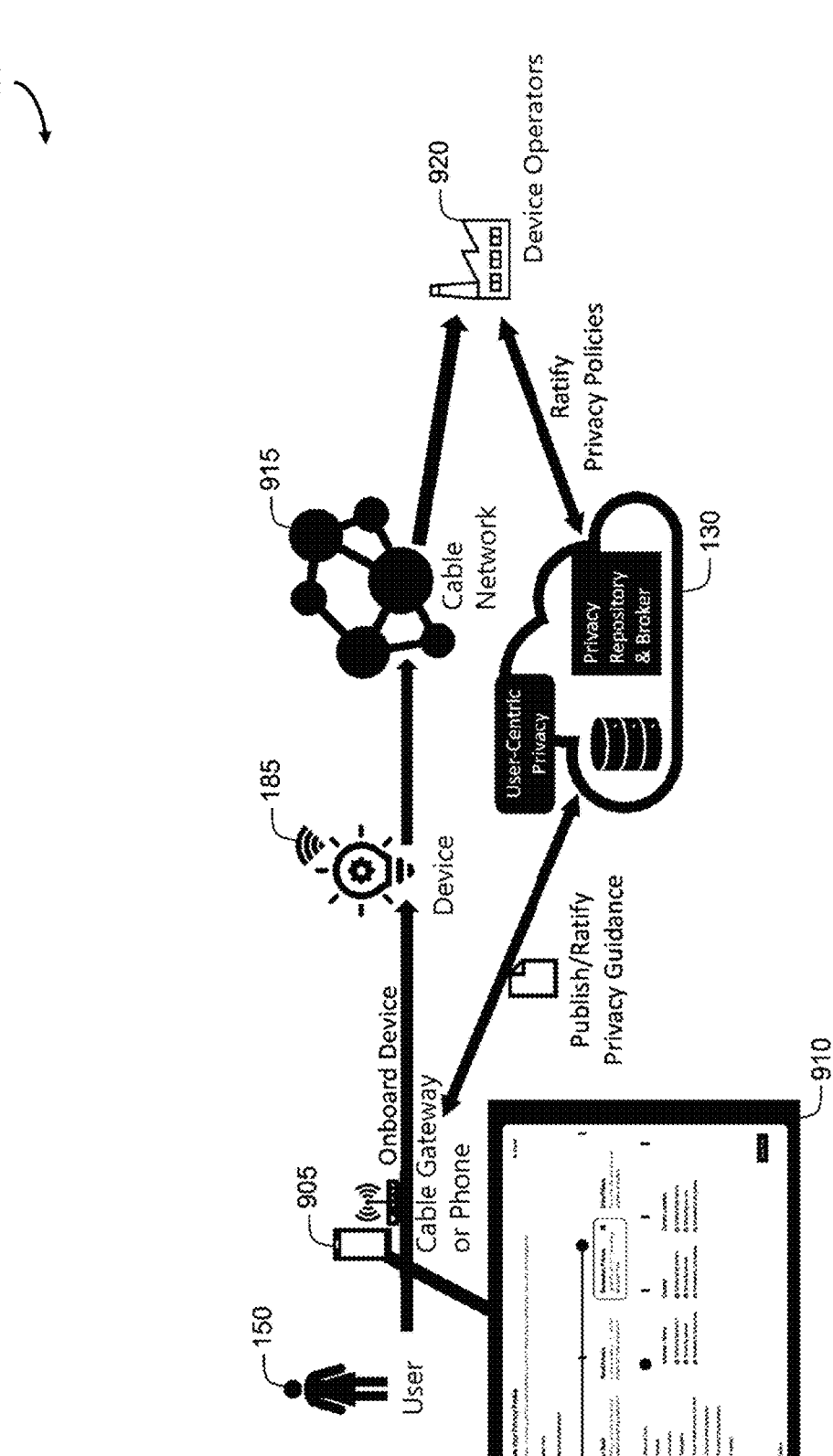
FIG. 9 illustrates a flow diagram for an additional system in accordance with at least one embodiment of this disclosure.

FIG. 9 illustrates a flow diagram for an additional system 900 in accordance with at least one embodiment of this disclosure. In system 900, a consumer 150 uses an onboarding device 905. The onboarding device 905 can include, but is not limited to, a cable gateway and/or a phone or other device that allows the consumer 150 to access one or more networks and/or the Internet. In the exemplary embodiment, onboarding device 905 provides the consumer 150 access to one or more consumer interfaces 910 to communication with the programs described herein. The consumer interface 910 allows the consumer to create and store privacy guidance information, such as the CUD file 610 (shown in FIG. 6) as described herein. The user interface 910 can also allow a service provider user who is a part of a service provider 105 (shown in FIG. 1) to create and store service privacy request information, such as the SUD file described herein.

The onboarding device 905 also allows the consumer 150 to access one or more devices 185, such as IoT devices. These IoT devices 185 then access a cable network 915 to access device operators 920. When the devices 185 access, the device operators 920, the device operators 920 can ratify the privacy information, such as SUD and/or CUD files 610.

Figure 10A:
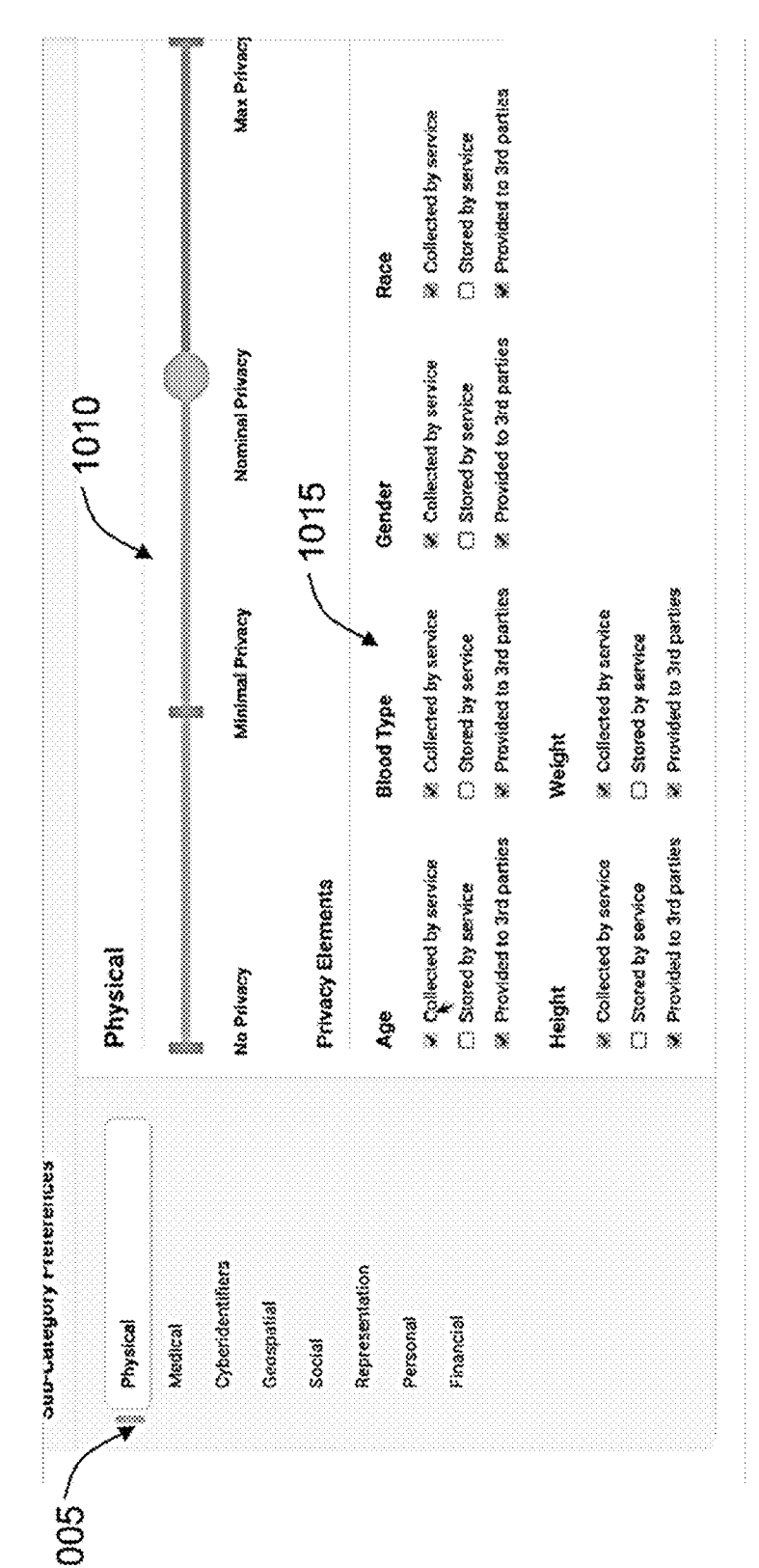
FIGS. 10A and 10B illustrate two different views and of a user interface shown in FIG. 9 for assisting a consumer shown in FIG. 1 to generate a CUD file shown in FIG. 6.
Figure 10B:
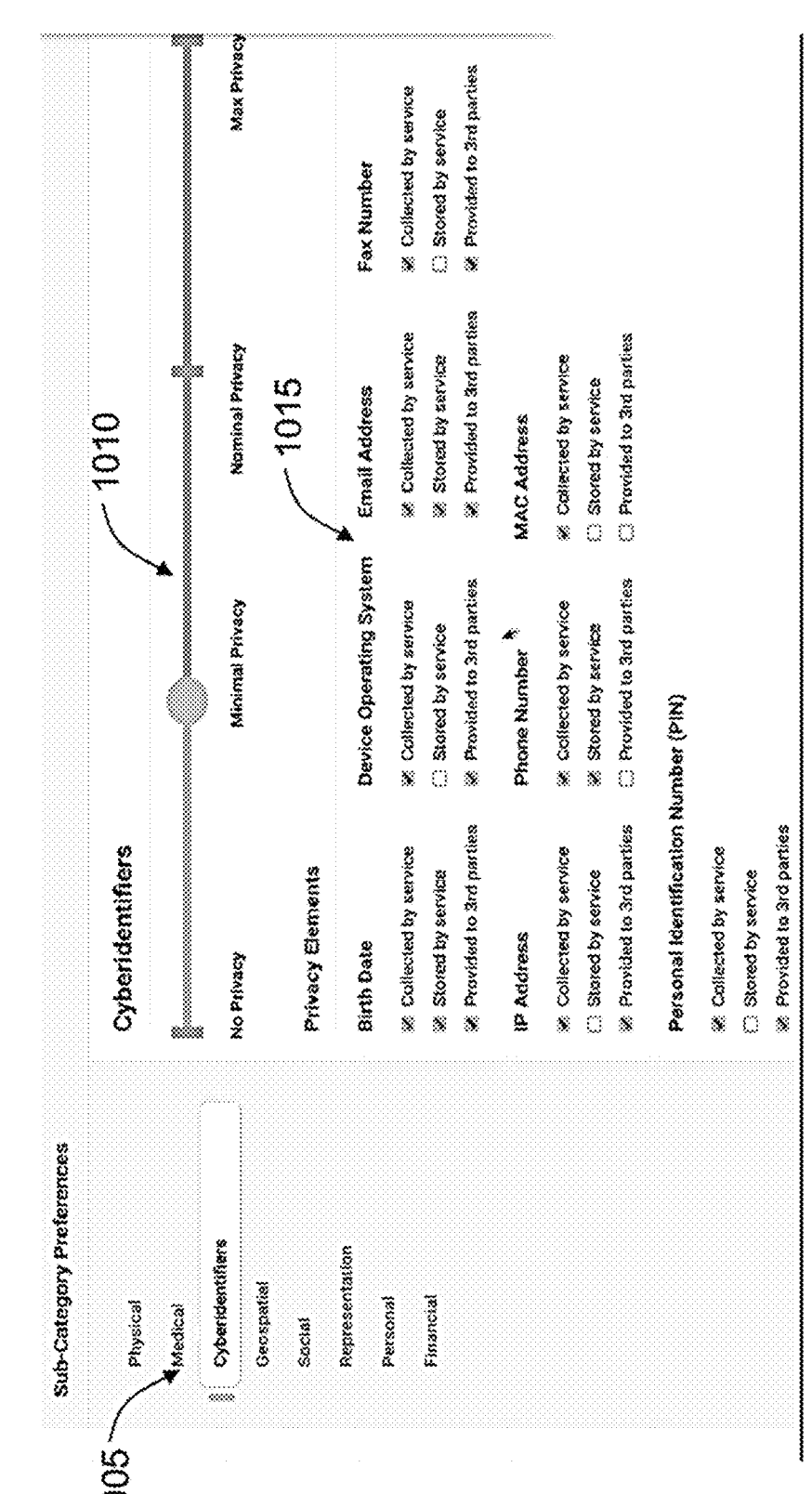

FIGS. 10A and 10B illustrate two different views 1000 and 1020 of user interface 910 (shown in FIG. 9) for assisting a consumer 150 (shown in FIG. 1) to generate a CUD file 610 (shown in FIG. 6). In FIG. 10A, view 1000 displays a category sidebar 1005 including a plurality of categories of items of data that the consumer 150 (shown in FIG. 1) may want to keep private or that could be considered PD. In view 1000 the category of physical has been selected. View 1000 also includes a privacy level slider 1010 that allows the consumer 150 to quickly select a level of privacy for their data in selected category and a plurality of privacy elements 1015 associated with the selected category. Each level of privacy on the privacy level slider 1010 has default values for each of the privacy elements 1015. When the consumer 150 selects a privacy level on the slider 1010, the system automatically sets the plurality of privacy elements 1015 based on that privacy level. The consumer 150 can also select individual privacy elements 1015 to set to either protect or allow.

In FIG. 10B, view 1020 also displays a category sidebar 1005, but in this case, the cyberidentifiers category was selected. View 1020 displays the privacy level slider 1010 and privacy elements 1015 associated with the cyberidentifiers category.

Figure 11:
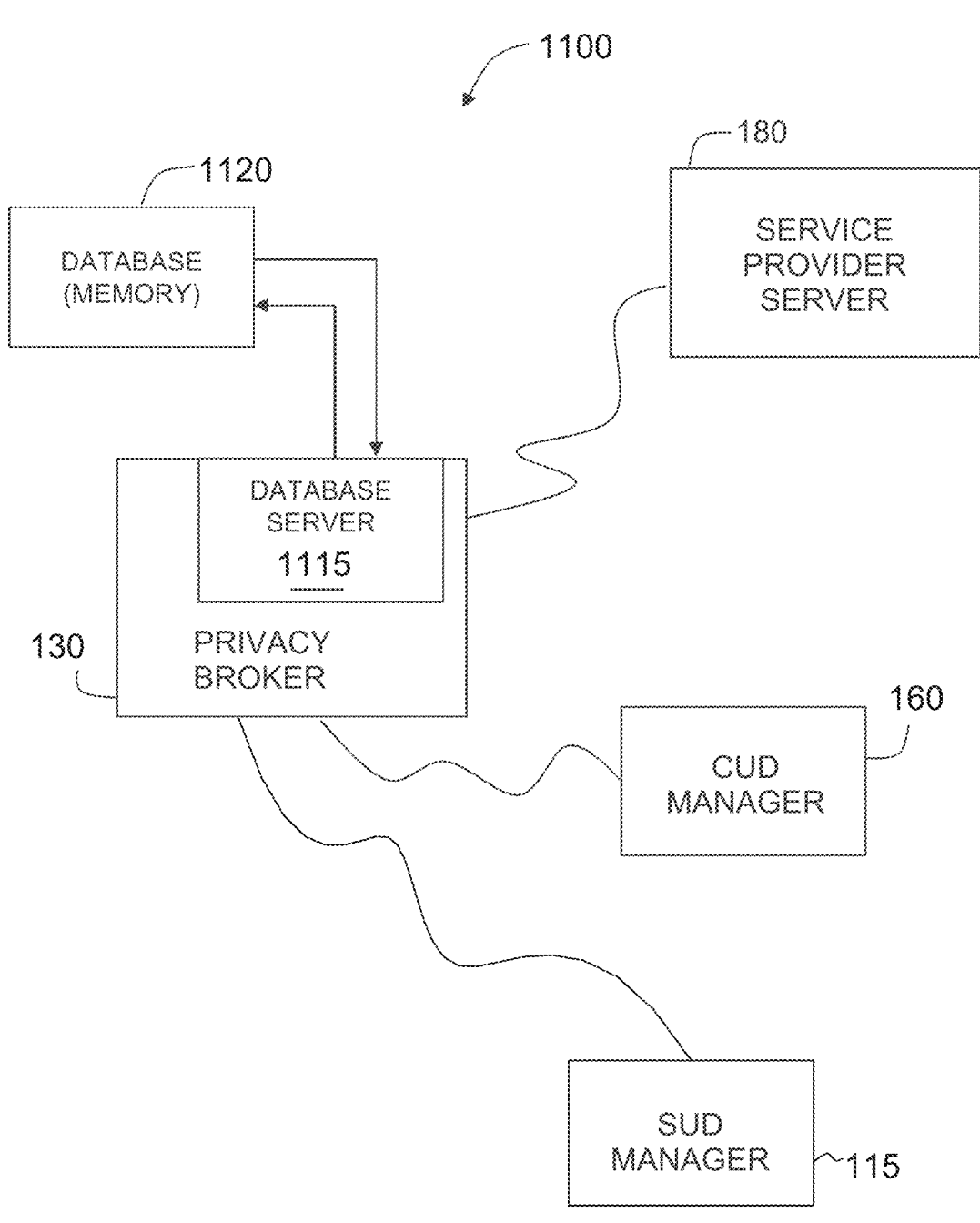
FIG. 11 depicts a simplified block diagram of an exemplary computer system for implementing the processes shown in FIGS. 3-5.

FIG. 11 depicts a simplified block diagram of an exemplary computer system 1100 for implementing processes 300, 400, and 500 shown in FIGS. 3-5. In the exemplary embodiment, system 1100 may be used for protecting consumer privacy, as described below in more detail.

In the exemplary embodiment, SUD managers 115 are computers that include a web browser or a software application, which enables SUD managers 115 to access privacy broker 130 using the Internet. More specifically, SUD managers 115 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. SUD managers 115 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets, or glasses (e.g., AR (augmented reality), VR (virtual reality), or XR (extended reality) headsets or glasses), chat bots, or other web-based connectable equipment or mobile devices.

In the exemplary embodiment, CUD managers 160 are computers that include a web browser or a software application, which enables CUD managers 160 to access privacy broker 130 using the Internet. More specifically, CUD managers 160 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. CUD managers 160 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets, or glasses (e.g., AR (augmented reality), VR (virtual reality), or XR (extended reality) headsets or glasses), chat bots, or other web-based connectable equipment or mobile devices.

A database server 1115 may be communicatively coupled to a database 1120 that stores data. In one embodiment, database 1120 may include CUD files 610 (shown in FIG. 6), SUD files, SUD LIs 135, and CUD LIs 175 (both shown in FIG. 1), and/or consumer preferences. In the exemplary embodiment, database 1120 may be stored remotely from privacy broker 130. In some embodiments, database 1120 may be decentralized. In the exemplary embodiment, a person may access database 1120 via CUD manager 160 or service provider server 180 by logging onto privacy broker 130, as described herein.

Privacy broker 130 may be communicatively coupled with one or more the CUD managers 160 and/or one or more SUD managers 115. In some embodiments, privacy broker 130 may be associated with, or is part of a computer network associated with a privacy organization or an internet service provider, or in communication with the internet service provider computer network (not shown). In other embodiments, privacy broker 130 may be associated with a third party and is merely in communication with the internet service provider computer network.

One or more service provider servers 180 may be communicatively coupled with privacy broker 130 via the Internet or a local network. More specifically, service provider servers 180 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Service provider servers 180 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets, or glasses (e.g., AR (augmented reality), VR (virtual reality), or XR (extended reality) headsets or glasses), chat bots, or other web-based connectable equipment or mobile devices.

Figure 12:
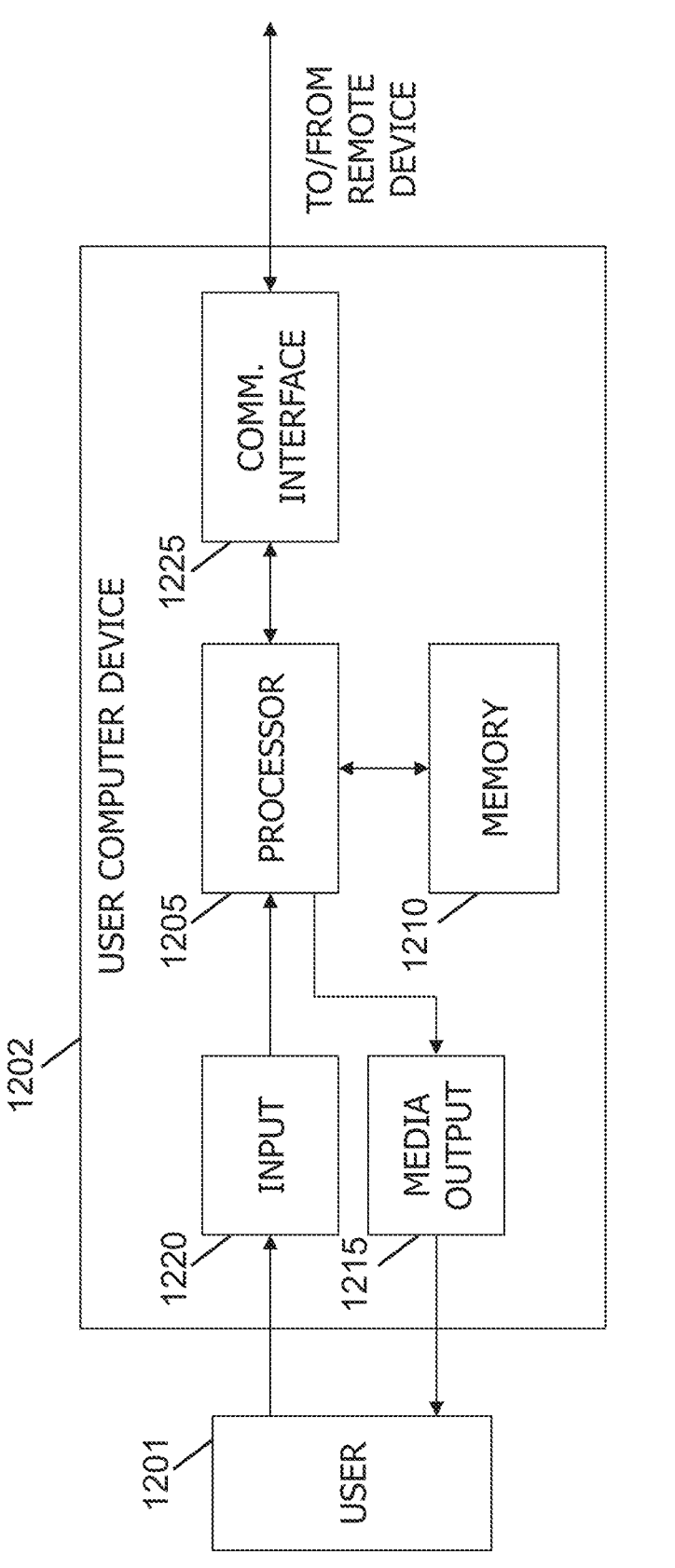
FIG. 12 depicts an exemplary configuration of client computer devices, in accordance with one embodiment of the present disclosure.

FIG. 12 depicts an exemplary configuration of client computer devices, in accordance with one embodiment of the present disclosure. User computer device 1202 may be operated by a user 1201. User computer device 1202 may include, but is not limited to, SUD manager 115, privacy broker 130, CUD manager 160, devices 185 (all shown in FIG. 1), service provider computer device 305 (shown in FIG. 3), consumer computer device 405 (shown in FIG. 4), and onboarding device 905 (shown in FIG. 9). User computer device 1202 may include a processor 1205 for executing instructions. In some embodiments, executable instructions are stored in a memory area 1210. Processor 1205 may include one or more processing units (e.g., in a multi-core configuration). Memory area 1210 may be any device allowing information such as executable instructions and/or transaction data to be stored and retrieved. Memory area 1210 may include one or more computer readable media.

User computer device 1202 may also include at least one media output component 1215 for presenting information to user 1201. Media output component 1215 may be any component capable of conveying information to user 1201. In some embodiments, media output component 1215 may include an output adapter (not shown) such as a video adapter and/or an audio adapter. An output adapter may be operatively coupled to processor 1205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 1215 may be configured to present a graphical user interface (e.g., a web browser and/or a client application) to user 1201. A graphical user interface may include, for example, user interface 910 (shown in FIG. 9) illustrating privacy elements 1015 (shown in FIG. 10A). In some embodiments, user computer device 1202 may include an input device 1220 for receiving input from user 1201. User 1201 may use input device 1220 to, without limitation, select and/or enter one or more policy definitions 155 (shown in FIG. 1).

Input device 1220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1215 and input device 1220.

User computer device 1202 may also include a communication interface 1225, communicatively coupled to a remote device such as privacy broker 130 (shown in FIG. 1). Communication interface 1225 may include, for example, a wired or wireless network adapter and/or a wireless data transceiver for use with a mobile telecommunications network.

Stored in memory area 1210 are, for example, computer readable instructions for providing a user interface to user 1201 via media output component 1215 and, optionally, receiving and processing input from input device 1220. A user interface may include, among other possibilities, a web browser and/or a client application. Web browsers enable users, such as user 1201, to display and interact with media and other information typically embedded on a web page or a website from privacy broker 130. A client application allows user 1201 to interact with, for example, privacy elements 1015. For example, instructions may be stored by a cloud service, and the output of the execution of the instructions sent to the media output component 1215.

Processor 1205 executes computer-executable instructions for implementing aspects of the disclosure. In some embodiments, the processor 1205 is transformed into a special purpose microprocessor by executing computer-executable instructions or by otherwise being programmed. For example, the processor 1205 may be programmed with the instructions such as processes 300, 400, and 500 (shown in FIGS. 3-5, respectively).

Figure 13:
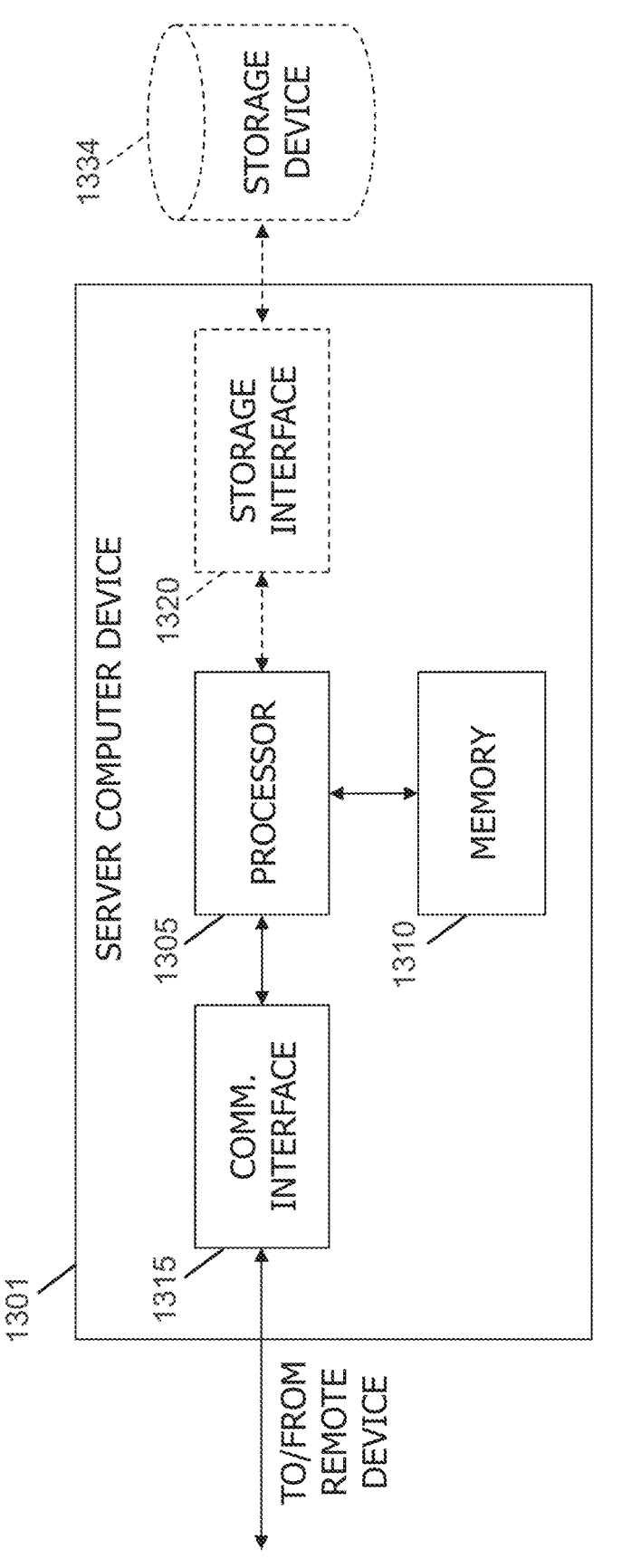
FIG. 13 illustrates an example configuration of the server system, in accordance with one embodiment of the present disclosure.

FIG. 13 illustrates an example configuration of the server system, in accordance with one embodiment of the present disclosure. Server computer device 1301 may include, but is not limited to, SUD manager 115, privacy broker 130, CUD manager 160, service provider server 180 (all shown in FIG. 1), onboarding device 905, device operators 920 (both shown in FIG. 9), and database server 1115 (shown in FIG. 11). Server computer device 1301 also includes a processor 1305 for executing instructions. Instructions may be stored in a memory area 1310. Processor 1305 may include one or more processing units (e.g., in a multi-core configuration).

Processor 1305 is operatively coupled to a communication interface 1315 such that server computer device 1301 is capable of communicating with a remote device such as another server computer device 1301, privacy broker 130, consumer computer device 405 (shown in FIG. 4), or service provider server 180. For example, communication interface 1315 may receive requests from consumer computer device 405 via the Internet.

Processor 1305 may also be operatively coupled to a storage device 1334. Storage device 1334 is any computer-operated hardware suitable for storing and/or retrieving data, such as, but not limited to, data associated with database 1120 (shown in FIG. 11). In some embodiments, storage device 1334 is integrated in server computer device 1301. For example, server computer device 1301 may include one or more hard disk drives as storage device 1334. In other embodiments, storage device 1334 is external to server computer device 1301 and may be accessed by a plurality of server computer devices 1301. For example, storage device 1334 may include a storage area network (SAN), a network attached storage (NAS) system, and/or multiple storage units such as hard disks and/or solid state disks in a redundant array of inexpensive disks (RAID) configuration.

In some embodiments, processor 1305 is operatively coupled to storage device 1334 via a storage interface 1320. Storage interface 1320 is any component capable of providing processor 1305 with access to storage device 1334. Storage interface 1320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1305 with access to storage device 1334.

Processor 1305 executes computer-executable instructions for implementing aspects of the disclosure. In some embodiments, the processor 1305 is transformed into a special purpose microprocessor by executing computer-executable instructions or by otherwise being programmed. For example, the processor 1305 is programmed with the instructions such as processes 300, 400, and 500 (shown in FIGS. 3-5, respectively).

In the exemplary embodiments, a server 1301 for protecting consumer privacy can include, but is not limited to, a privacy broker 130, a SUD manager 115, and a CUD manager 160. The server 1301 includes a processor 1305 and a memory 1310 configured to store computer-executable instructions. When executed by the processor 1305, the instructions cause the server 1301 to store a consumer privacy preference storage (one example of which is CUD LIs 175 (shown in FIG. 1)) for a plurality of privacy preferences (one example of which is CUD files 610 (shown in FIG. 6)) associated with a plurality of consumers 150 (shown in FIG. 1). The plurality of privacy preferences (CUD file 610) indicates whether or not a corresponding consumer 150 will allow each a plurality of items of data to be collected by a service 105. The server 1301 receives, from a consumer computer device 405 (shown in FIG. 4) associated with a consumer 150, an access request 205 (shown in FIG. 2) to access a service 105 (shown in FIG. 1). The server 1301 receives a service privacy request storage (one example of which is SUD LI 135, shown in FIG. 1) for a plurality of privacy requests (one example of which is a SUD file) for the service 105. The plurality of privacy requests (SUD file) indicates whether or not a service 105 will request to collect each of a plurality of items of data from a consumer 150 to be able to use the service 105. The server 1301 retrieves a consumer privacy preference storage (one example of which is the CUD LI 175) associated with the consumer 150. The server 1301 retrieves a privacy preference (one example of which is CUD file 610) associated with the consumer 150 using the consumer privacy preference storage (such as CUD LI 175). The server 1301 retrieves a privacy request (such as SUD file) associated with the service 105 using the service privacy request storage (such as SUD LI 135). The server 1301 compares the privacy preference (CUD file 610) to the privacy request (such as SUD file) to determine if there are any conflicts (such as differences (210). A conflict 210 occurs between the privacy request (such as SUD file) attempts to collect an item of data that the privacy preference (such as CUD file 610) denies.

If there are no conflicts 510, the server 1301 permits the consumer computer device 405 to access the service 105. If there are any conflicts 210, the server 1301 transmits a request to the consumer 150 via the consumer computer device 410. The request asks the consumer 150 if they approve overriding the conflict 210. If the consumer 150 approves overriding the conflict 210, the server 1301 permits the consumer computer device 405 to access the service 105. If the consumer 150 denies overriding the conflict 210, the server 1301 denies the consumer computer device 405 access to the service 105. In some embodiments, the server 1301 to updates the privacy preference (such as CUD file 610) to indicate that the consumer 150 approved overriding the conflict 210. The server 1301 also updates the privacy request (such as SUD file) to indicate that the consumer 150 approved overriding the conflict 210. In some embodiments, the update to the privacy request (such as SUD file) is signed by a service server 180 (shown in FIG. 1) associated with the service 105. In some further embodiments, the update to the privacy preference (such as CUD file 610) is signed by a service server 180 associated with the service 105.

In some embodiments, the privacy preference (such as CUD file 610) is encrypted. In some additional embodiments, the consumer privacy preference storage (such as CUD LI 175) includes at least one of a decryption key or a location of a decryption key for the privacy preference (such as CUD file 610).

In some embodiments, the server 1301 transmits the access request 205 to a service server 180 associated with the service 105. The server 1301 receives from the service server 180, an access response including the service privacy request storage (such as SUD LI 135) for the plurality of privacy requests (such as SUD file) for the service 105.

In some further embodiments, the server 1301 receives a plurality of privacy definitions 155 (shown in FIG. 1) from the consumer computer device 405. The server 1301 generates the privacy preference (such as CUD file 610) for the consumer 150 based on the plurality of privacy definitions 155. The server 1301 stores the privacy preference (such as CUD file 610). The server 1301 generates a consumer privacy preference storage (such as CUD LI 175) based on the stored privacy preference (CUD file 610). The server 1301 provides the consumer privacy preference storage (such as CUD LI 175) to the consumer computer device 405.

In at least one embodiment, the server 1301 receives one or more updates to the privacy preference (such as CUD file 610) from the consumer 150 via the consumer computer device 405. The server 1301 retrieves the privacy preference (such as CUD file 610) using the consumer privacy preference storage (such as CUD LI 175). The server 1301 updates the privacy preference (such as CUD file 610) based on the one or more updates. The server 1301 stores the updated privacy preference (such as CUD file 610 based on the consumer privacy preference storage (such as CUD LI 175).

In some embodiments, the consumer privacy preference storage (such as CUD LI 175) is a LI that links to where the privacy preference (such as CUD file 610) are stored. The service privacy request storage (such as SUD LI 135) is a LI that links to where the privacy request (SUD file) is stored. The privacy preference (such as CUD file 610) and the privacy request (SUD file) are formatted in XML.

In still additional embodiments, the server 1301 stores a plurality of masked consumer privacy preference storages (such as CUD LI 175). A masked consumer privacy preference storage (such as CUD LI 175) is provided to requesting services 105. The server 1301 receives a masked consumer privacy preference storage (such as CUD LI 175) and looks-up the consumer privacy preference storage (such as CUD LI 175) based on the received masked consumer storage location (such as CUD LI 175).

In a further embodiment, a server 1301 receives, from a consumer computer device 185 associated with a consumer 150, an access request to access a service 105. The server 1301 retrieves a consumer privacy preference (one example of which is CUD file 610) associated with the consumer 150 from a consumer privacy preference storage (one example of which is CUD LI 175). The server 1301 retrieves a service privacy request (one example of which is SUD file) associated with the service 105 from a service privacy request storage (one example of which is SUD LI 135). The server 1301 compares the consumer privacy preference (such as CUD file 610) to the service privacy request (such as SUD file) to determine if there are any conflicts 210. If there are no conflicts, the server 1031 permits the consumer computer device 185 to access the service 105.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on computer systems or mobile devices, or associated with or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The present systems and methods are further advantageous over conventional techniques the embodiments herein are not confined to a single ecosystem, but may instead allow for versatile operation within multiple ecosystems. Accordingly, these novel techniques are of particular value to communication interface manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer need not be concerned of the unknown costs of a device that may be deployed within multiple ecosystems.

Exemplary embodiments of systems and methods for analyzing communication interface designs are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant Protected Entities (PEs) and Protected Data (PD).

Based upon these analyses, the processing element may learn how to identify characteristics and patterns that may then be applied to analyzing sensor data, vehicle or home telematics data, image data, transmission data, mobile device data, and/or other data.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A server for protecting consumer privacy, comprising:
a processor; and
a memory configured to store computer-executable instructions, when executed by the processor, cause the server to:
    receive, from a consumer computer device associated with a consumer, an access request to access a service;
    retrieve a consumer privacy preference document associated with the consumer from a consumer privacy preference storage, wherein the consumer privacy preference document indicates whether or not a corresponding consumer will allow each of a plurality of items of data to be collected by one or more collection devices for a service, wherein the plurality of items of data include one or more items of personally identifiable data, wherein the consumer privacy preference document allows a first item of data of the plurality of items of data to be collected and prohibits a second item of data of the plurality of items of data to be collected, and wherein the first item of data of the plurality of items of data to be collected is allowed to be collected by a first service and not allowed to be collected by a second service;
    retrieve a service privacy request associated with the service from a service privacy request storage, wherein the service privacy request indicates whether or not the service will request to collect each of a plurality of items of data from a consumer to be able to use the service, wherein the service privacy request includes requesting the first item of data of the plurality of items of data and the second item of data of the plurality of items of data;
    compare the consumer privacy preference document to the service privacy request to determine if there are any conflicts, wherein each requested item of the plurality of items of data are compared to the corresponding setting from the consumer privacy preference document for the corresponding item, and wherein a conflict is where a requested item is prohibited by the consumer privacy preference document;
    if there are no conflicts, permit the consumer computer device to access the service, wherein the service will receive each requested item of data via the one or more collection devices;
    if there are one or more conflicts, determine one or more allowed items of data of the plurality of items of data are allowed by the consumer privacy preference document and are requested by the service privacy request, wherein the one or more allowed items of data include the first item of data; and
    if there are one or more conflicts, permit the consumer computer device to access the service, wherein the services will receive from the one or more collection devices the items of data from the one or more allowed items including the first item of data, and wherein the services will not receive any requested items that were prohibited by the consumer privacy preference document.

2. A server in accordance with claim 1, wherein the instructions further cause the server to:
    if there are any conflicts, transmit a request to the consumer via the consumer computer device, wherein the request asks the consumer if they approve overriding the conflict for a specific period of time; and
    if the consumer approves overriding the conflict, permit the consumer computer device to access the service for the specific period of time.

3. A server in accordance with claim 2, wherein if the consumer denies overriding the conflict, the instructions further cause the server to deny the consumer computer device access to the service.

4. A server in accordance with claim 2, wherein the instructions further cause the server to update the consumer privacy preference document to indicate that the consumer approved overriding the conflict to permit the consumer to access the service for the specific period of time.

5. A server in accordance with claim 4, wherein the instructions further cause the server to update the service privacy request to indicate that the consumer approved overriding the conflict to access the service for a period of time.

6. A server in accordance with claim 5, wherein at least one of the update to the service privacy request and the update to the consumer privacy preference document is signed by a service server associated with the service using a key associated with the service server.

7. A server in accordance with claim 4, wherein at least one of the update to the consumer privacy preference document and the update to the service privacy request is signed by an encryption key associated with the consumer.

8. A server in accordance with claim 1, wherein the consumer privacy preference document indicates whether or not a corresponding consumer will allow each of a plurality of items of data to be collected by a service.

9. A server in accordance with claim 8, wherein the service privacy request indicates whether or not a service will request to collect each of a plurality of items of data from a consumer to be able to use the service, and wherein a conflict occurs between the service privacy request attempts to collect an item of data that the consumer privacy preference document denies.

10. A server in accordance with claim 1, wherein consumer privacy preference document stores a plurality of locations for the consumer computer device and associates different items of the plurality of items of data with different locations of the plurality of locations.

11. A server in accordance with claim 1, wherein the consumer privacy preference document is encrypted.

12. A server in accordance with claim 11, the consumer privacy preference storage includes at least one of a decryption key or a location of a decryption key for the consumer privacy preference document.

13. A server in accordance with claim 1, wherein the instructions further cause the server to:
    transmit the access request to a service server associated with the service; and
    receive, from the service server, an access response including the service privacy request storage for the service privacy request for the service.

14. A server in accordance with claim 1, wherein the instructions further cause the server to:
    receive a plurality of privacy definitions from the consumer computer device; and
    generate the consumer privacy preference document for the consumer based on the plurality of privacy definitions.

15. A server in accordance with claim 14, wherein the instructions further cause the server to:
    store the consumer privacy preference document;

generate a consumer storage location based on the stored consumer privacy preference document; and provide the consumer storage location to the consumer computer device.

16. A server in accordance with claim 1, wherein the instructions further cause the server to allow the consumer computer device to access an Internet of Things device on a computer network; and apply the consumer privacy document to the Internet of Things device to configure the plurality of items of data to be collected.

17. A server device in accordance with claim 1, wherein the instructions further cause the server device to update the consumer privacy preference document based on one or more updates from the consumer via the consumer computer device.

18. A server device in accordance with claim 1, wherein the consumer privacy preference storage is a URL that links to where the consumer privacy preference document is stored, and wherein the service privacy request storage is a URL that links to where the service privacy request is stored.

19. A server device in accordance with claim 1, wherein the consumer privacy preference document and the service privacy request are formatted in XML.

20. A server device in accordance with claim 1, wherein the instructions further cause the server device to:

store a plurality of masked consumer storage locations, wherein a masked consumer storage location is provided to requesting services;

receive a masked consumer privacy preference storage; and look-up the consumer privacy preference storage based on the received masked consumer privacy preference storage.

21. A server for protecting consumer privacy, comprising:

a processor; and a memory configured to store computer-executable instructions, when executed by the processor, cause the server to:

receive, from a consumer computer device associated with a consumer, an access request to access a service;

retrieve a consumer privacy preference document associated with the consumer from a consumer privacy preference storage, wherein the consumer privacy preference document indicates whether or not a corresponding consumer will allow each of a plurality of items of data to be collected by one or more collection devices for a service, wherein the plurality of items of data include one or more items of personally identifiable data, wherein the consumer privacy preference document allows a first item of data of the plurality of items of data to be collected and prohibits a second item of data of the plurality of items of data to be collected, and wherein the first item of data of the plurality of items of data to be collected is allowed to be collected by a first service and not allowed to be collected by a second service;

retrieve a service privacy request associated with the service from a service privacy request storage, wherein the service privacy request indicates whether or not the service will request to collect each of a plurality of items of data from a consumer to be able to use the service, wherein the service privacy request includes requesting the first item of data of the plurality of items of data and the second item of data of the plurality of items of data;

compare the consumer privacy preference document to the service privacy request to determine if there are any conflicts, wherein each requested item of the plurality of items of data are compared to the corresponding setting from the consumer privacy preference document for the corresponding item, and wherein a conflict is where a requested item is prohibited by the consumer privacy preference document;

if there are any conflicts, transmit a request to the consumer via the consumer computer device, wherein the request asks the consumer if they approve overriding the conflict;

if the consumer approves overriding the conflict, permit the consumer computer device to access the service, wherein the service will receive each requested item of data via the one or more collection devices;

if there are one or more conflicts and the consumer does not approve overriding the conflict, determine one or more allowed items of data of the plurality of items of data are allowed by the consumer privacy preference document and are requested by the service privacy request, wherein the one or more allowed items of data include the first item of data; and if there are one or more conflicts and the consumer does not approve overriding the conflict, permit the consumer computer device to access the service, wherein the services will receive from the one or more collection devices the items of data from the one or more allowed items including the first item of data, and wherein the services will not receive any requested items that were prohibited by the consumer privacy preference document.

22. A server in accordance with claim 21, wherein if the consumer denies overriding the conflict, the instructions further cause the server to deny the consumer computer device access to the service.

23. A server in accordance with claim 21, wherein the instructions further cause the server to update the consumer privacy preference document to indicate that the consumer approved overriding the conflict to permit the consumer to access the service for the specific period of time.

24. A server in accordance with claim 23, wherein the instructions further cause the server to update the service privacy request to indicate that the consumer approved overriding the conflict to access the service for a period of time.

25. A server in accordance with claim 24, wherein at least one of the update to the service privacy request and the update to the consumer privacy preference document is signed by a service server associated with the service using a key associated with the service server.

26. A server in accordance with claim 23, wherein at least one of the update to the consumer privacy preference document and the update to the consumer privacy preference document is signed by an encryption key associated with the consumer.

* * * * *